(12) United States Patent
Roessett et al.

(10) Patent No.: US 7,549,262 B2
(45) Date of Patent: Jun. 23, 2009

(54) ROOF BOUNDARY CLIP

(75) Inventors: Charles Roessett, Brentwood, CA (US); Carl Y. Kuo, San Ramon, CA (US); Thomas B. McClain, Pleasanton, CA (US)

(73) Assignee: Simpson Strong-Tie Co., Inc., Pleasanton, CA (US)

( * ) Notice: Subject to any disclaimer, the term of this patent is extended or adjusted under 35 U.S.C. 154(b) by 0 days.

(21) Appl. No.: 11/860,440

(22) Filed: Sep. 24, 2007

(65) Prior Publication Data

US 2008/0005979 A1 Jan. 10, 2008

Related U.S. Application Data

(62) Division of application No. 10/693,595, filed on Oct. 23, 2003, now Pat. No. 7,293,390.

(51) Int. Cl.
*E04B 1/00* (2006.01)
*E04G 21/00* (2006.01)

(52) U.S. Cl. .................. 52/746.11; 52/92.1; 52/715; 52/702; 52/92.2; 52/92.3; 52/93.2

(58) Field of Classification Search ............ 52/746.11, 52/712, 715, 702, 92.1, 92.3, 93.1, 93.2, 52/698; 403/232.1, 237
See application file for complete search history.

(56) References Cited

U.S. PATENT DOCUMENTS

| | | | |
|---|---|---|---|
| 4,198,175 A | 4/1980 | Knepp et al. | |
| 4,410,294 A | 10/1983 | Gilb et al. | |
| 4,490,956 A | 1/1985 | Palacio et al. | |
| 4,530,194 A | 7/1985 | Linton et al. | |
| 4,570,407 A | 2/1986 | Palacio et al. | |
| 4,669,235 A | 6/1987 | Reinen | |
| 4,932,173 A | 6/1990 | Commins | |

(Continued)

FOREIGN PATENT DOCUMENTS

DE 296 10 435 U1 8/1996

(Continued)

OTHER PUBLICATIONS

*Wood Construction Connectors.* Catalog C-2001; pp. 15, 62-63, 92, 105-106, 112-113, 116-119, 126-132, 137. Copyright 2000. Simpson Strong-Tie Company, Inc., Dublin, CA.

(Continued)

*Primary Examiner*—Richard E Chilcot, Jr.
*Assistant Examiner*—Chi Q Nguyen
(74) *Attorney, Agent, or Firm*—James R. Cypher; Charles R. Cypher

(57) ABSTRACT

A roof boundary connection uses a clip that eases installation of the clip to blocking members both in the field by a carpenter and at a factory by one such as a truss manufacturer. The clip is formed with two indexing tabs that are set against the blocking for correct spacing and alignment. In one form, the clip is attached to wood members with nails and to masonry with masonry screws. In one form, the clip employs nail prongs as integral connectors for attachment to blocking members, allowing truss manufacturers to install connectors on blocking members with the same hydraulic presses that are used to assemble trusses with nail prong plates.

13 Claims, 22 Drawing Sheets

U.S. PATENT DOCUMENTS

| | | | |
|---|---|---|---|
| 5,230,198 | A | 7/1993 | Callies |
| 5,335,469 | A | 8/1994 | Stuart |
| 5,357,721 | A | 10/1994 | Alverez |
| 5,370,577 | A | 12/1994 | Jonnett et al. |
| 5,457,928 | A | 10/1995 | Sahnazarian |
| 5,697,725 | A | 12/1997 | Ballash et al. |
| 5,699,639 | A | 12/1997 | Fernandez |
| 5,797,694 | A | 8/1998 | Breivik |
| 6,254,306 | B1 | 7/2001 | Williams |
| 6,295,781 | B1 | 10/2001 | Thompson |
| 6,560,943 | B1 | 5/2003 | Leek et al. |
| 6,718,698 | B1 | 4/2004 | Thompson |
| 7,065,932 | B2 * | 6/2006 | Roesset et al. ................ 52/712 |
| 7,293,390 | B2 * | 11/2007 | Roesset et al. ................ 52/92.1 |
| 7,356,973 | B2 * | 4/2008 | Roesset et al. ................ 52/712 |

FOREIGN PATENT DOCUMENTS

GB      2 250 795 A      6/1992

OTHER PUBLICATIONS

"Torvhallkrok". BMF Catalog 1995-1995; p. 3. BMF Bygningsbeslag A/S, Norway.

"BMF torvallkrok." BMF Handverkerkatalog. Jun. 1995; pp. 8.15.1-2. BMF Bygningsbeslag A/S, Norway.

Declaration of Jürgen H. Wilhelmi, executed Feb. 8, 2005 regarding document entitled "Leggeanvisning og detaljer" (Instructions and details).

"Leggeanvisning og detaljer" (Instructions and details). Published at least as early as 2001 BMF Bygningsbeslag A/S, Norway.

Simpson Strong-Tie Company, "Wood Construction Connectors," The Well-Connected Structure, Simpson Strong-Tie Company (U.S. A.), p. 59, (1997).

Declaration With Attachments, "Attachment A and Attachment B," p. 3, (Jun. 17, 2004).

Simpson Strong-Tie Company, "Wood Construction Connectors," The Well-Connected Structure, Simpson Strong-Tie Company (U.S. A.), p. 58, (1998).

* cited by examiner

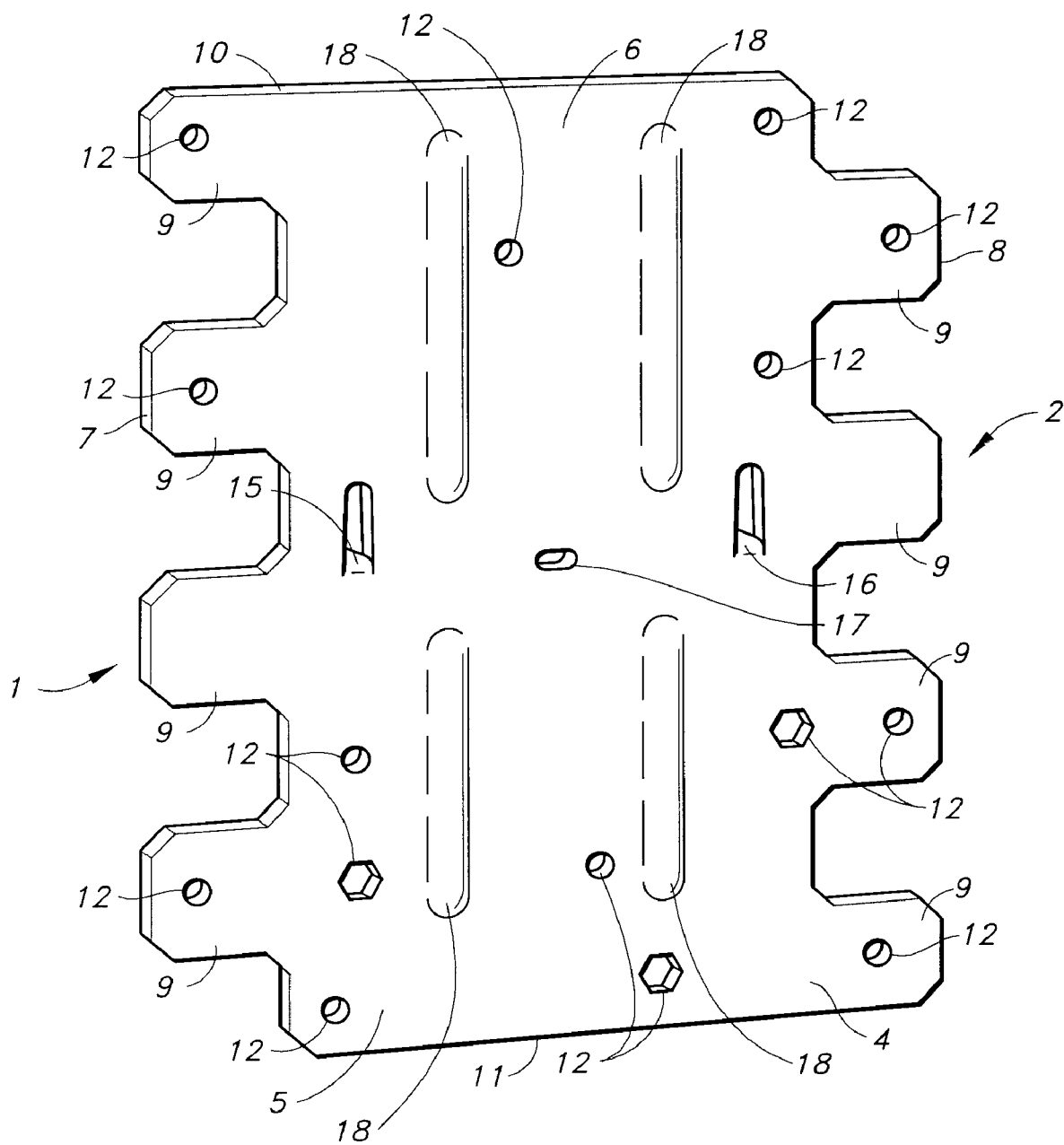
FIG._1

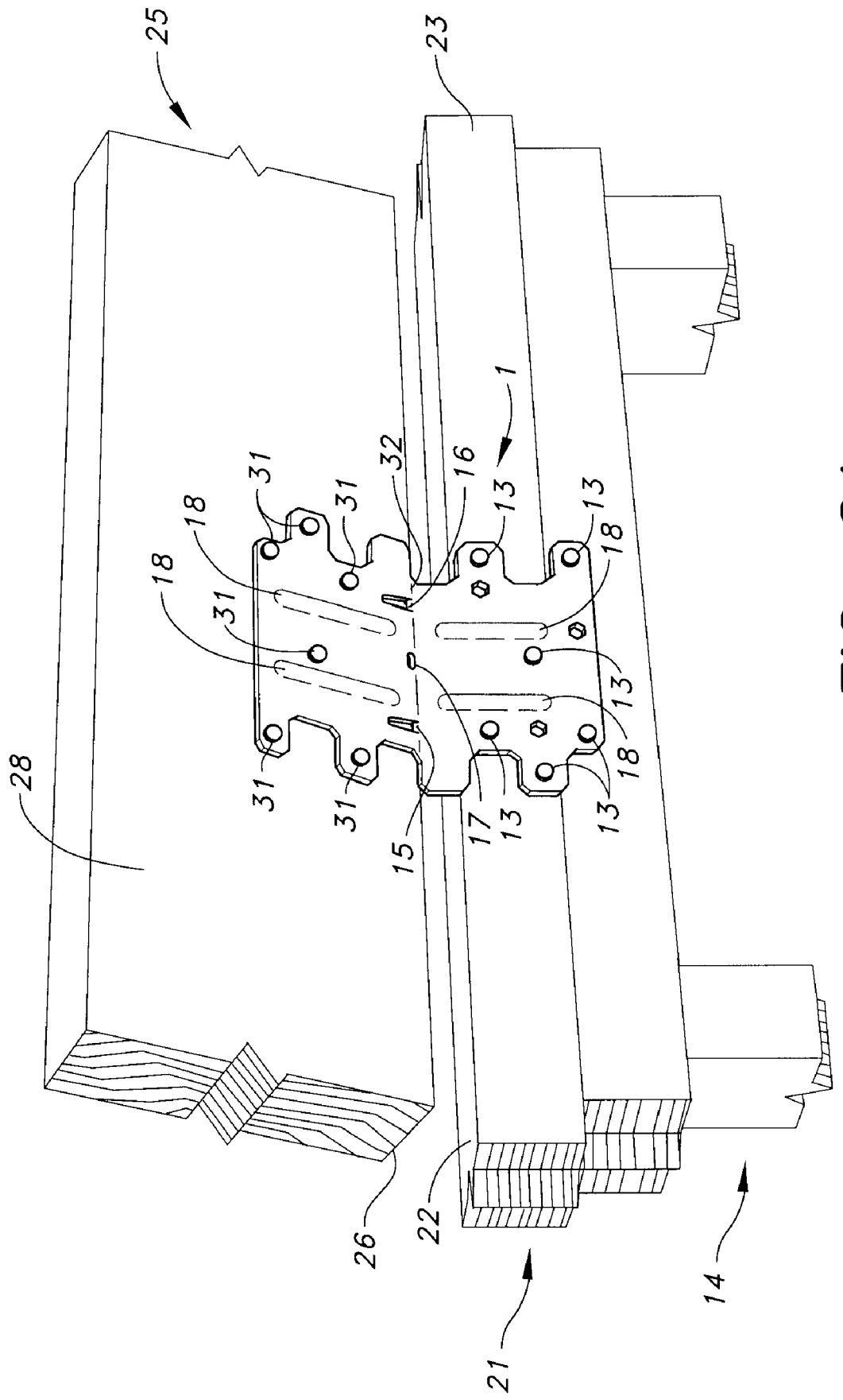
FIG._2A

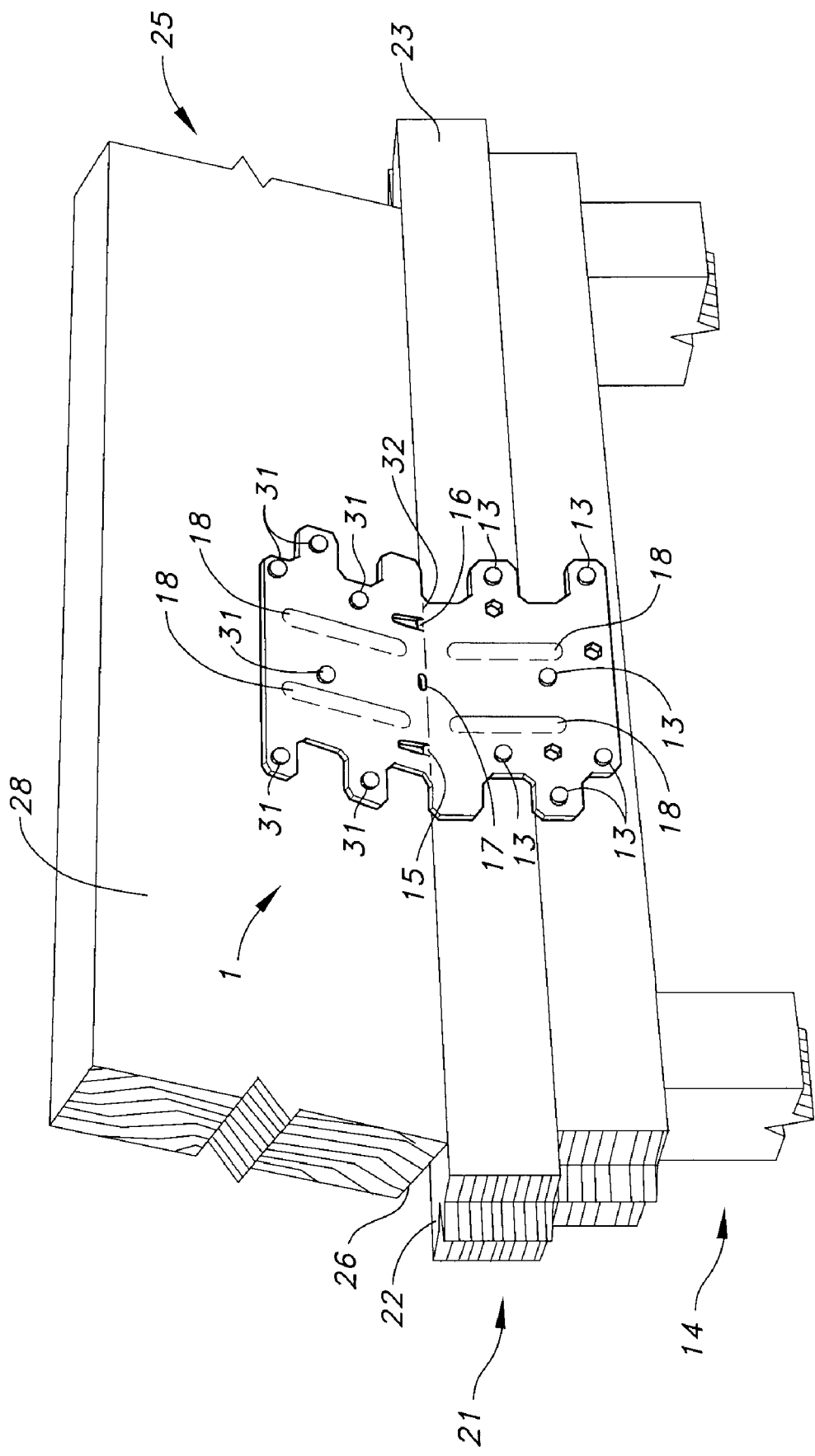
FIG._2B

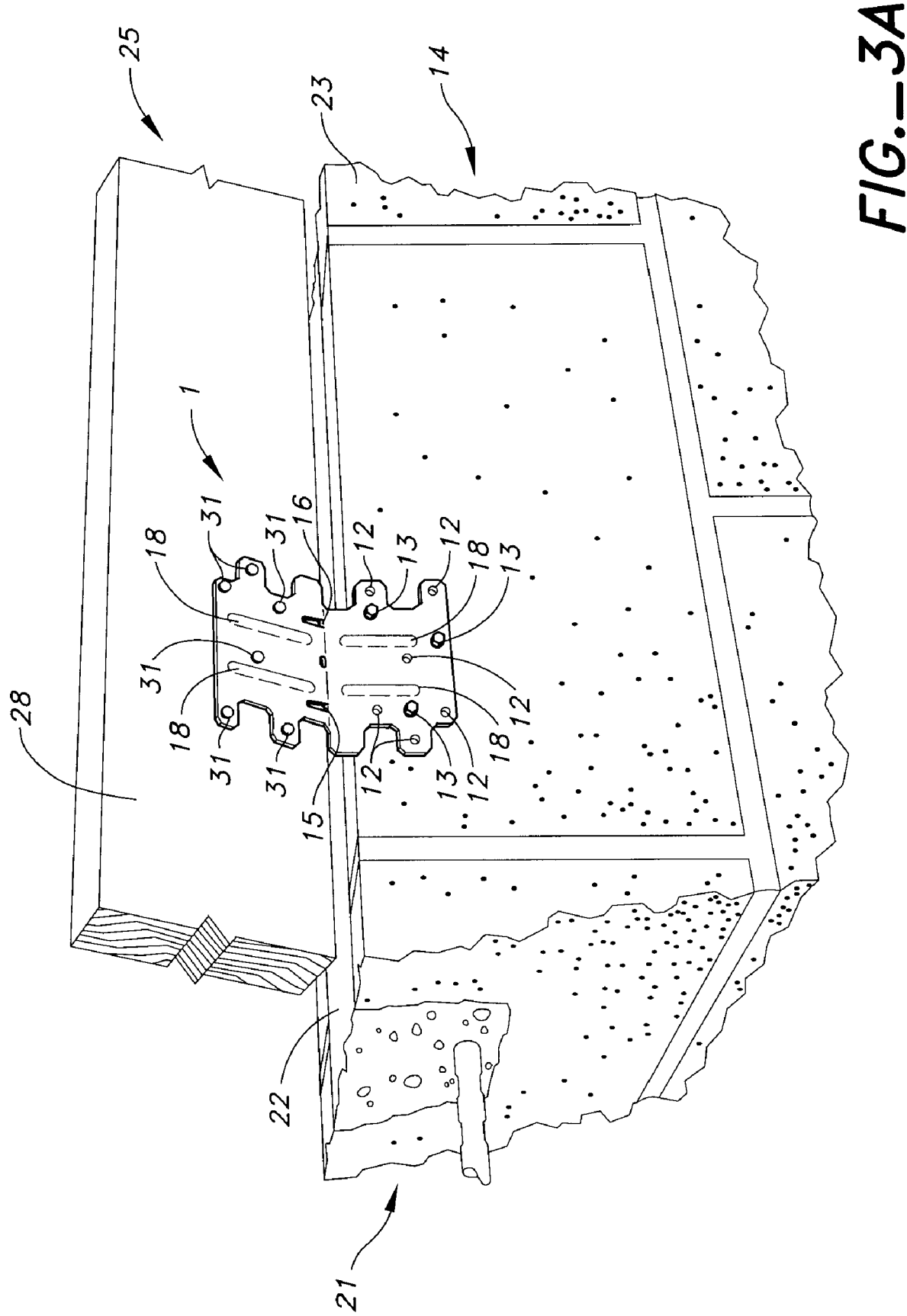
FIG._3A

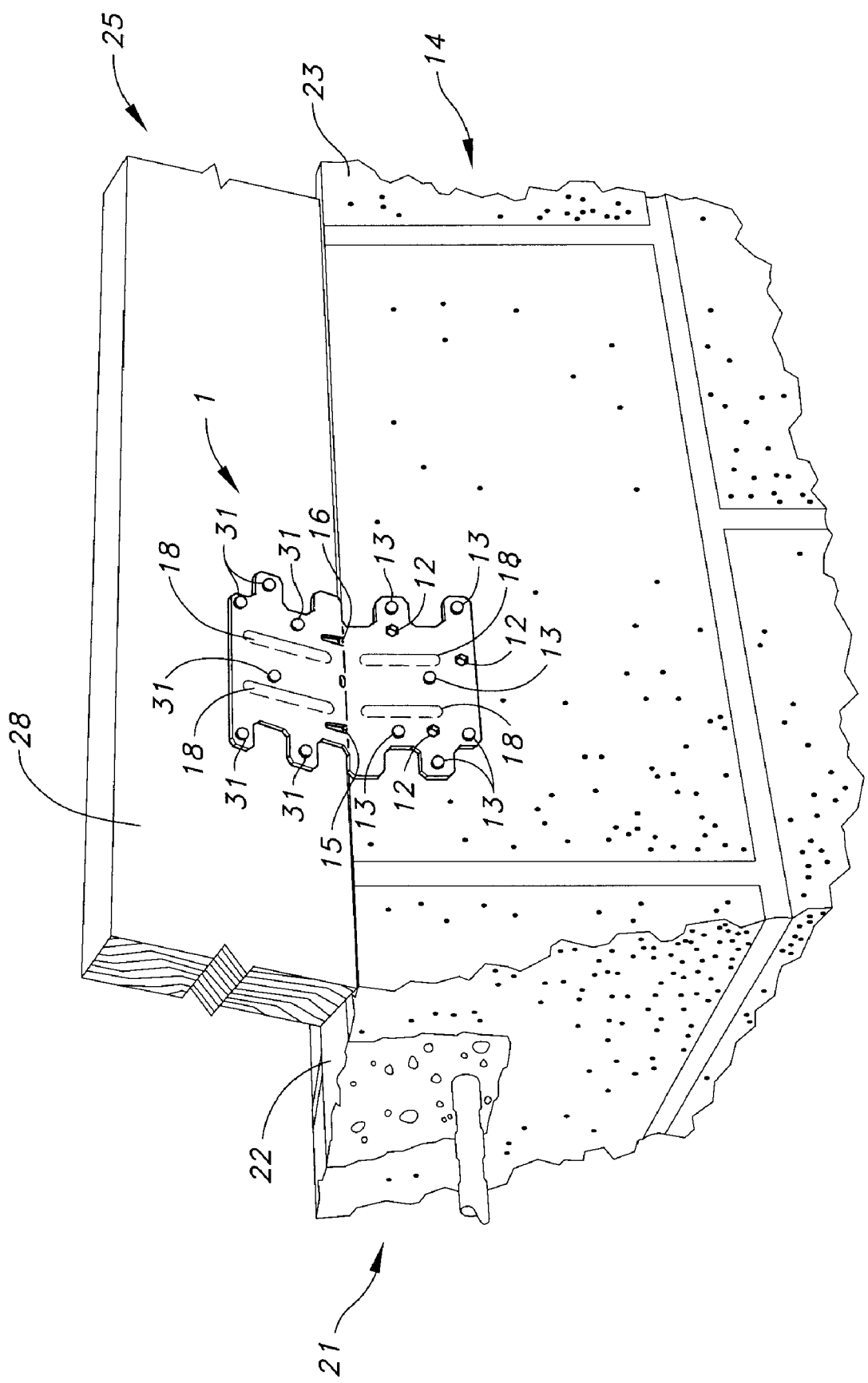

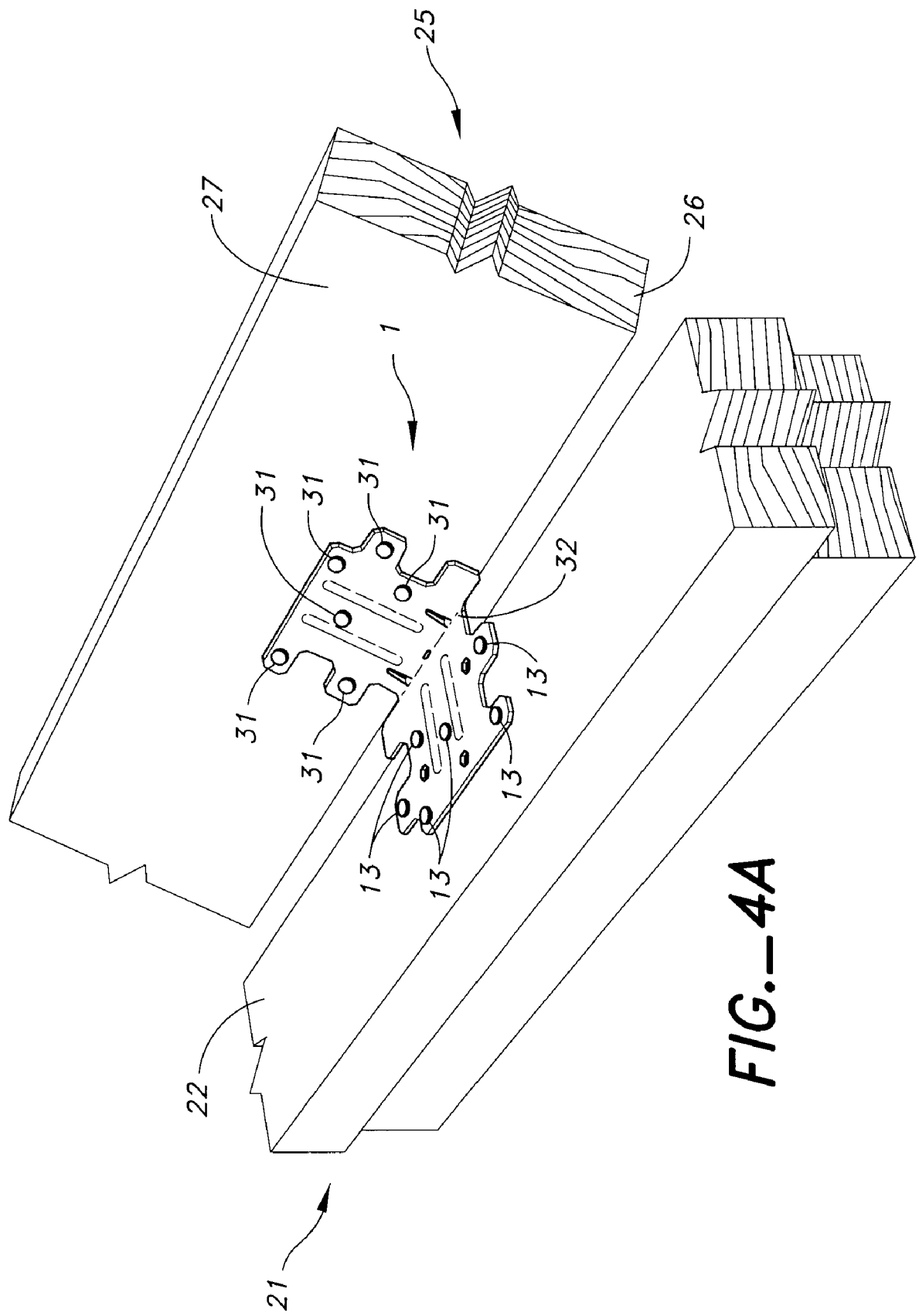
FIG._4A

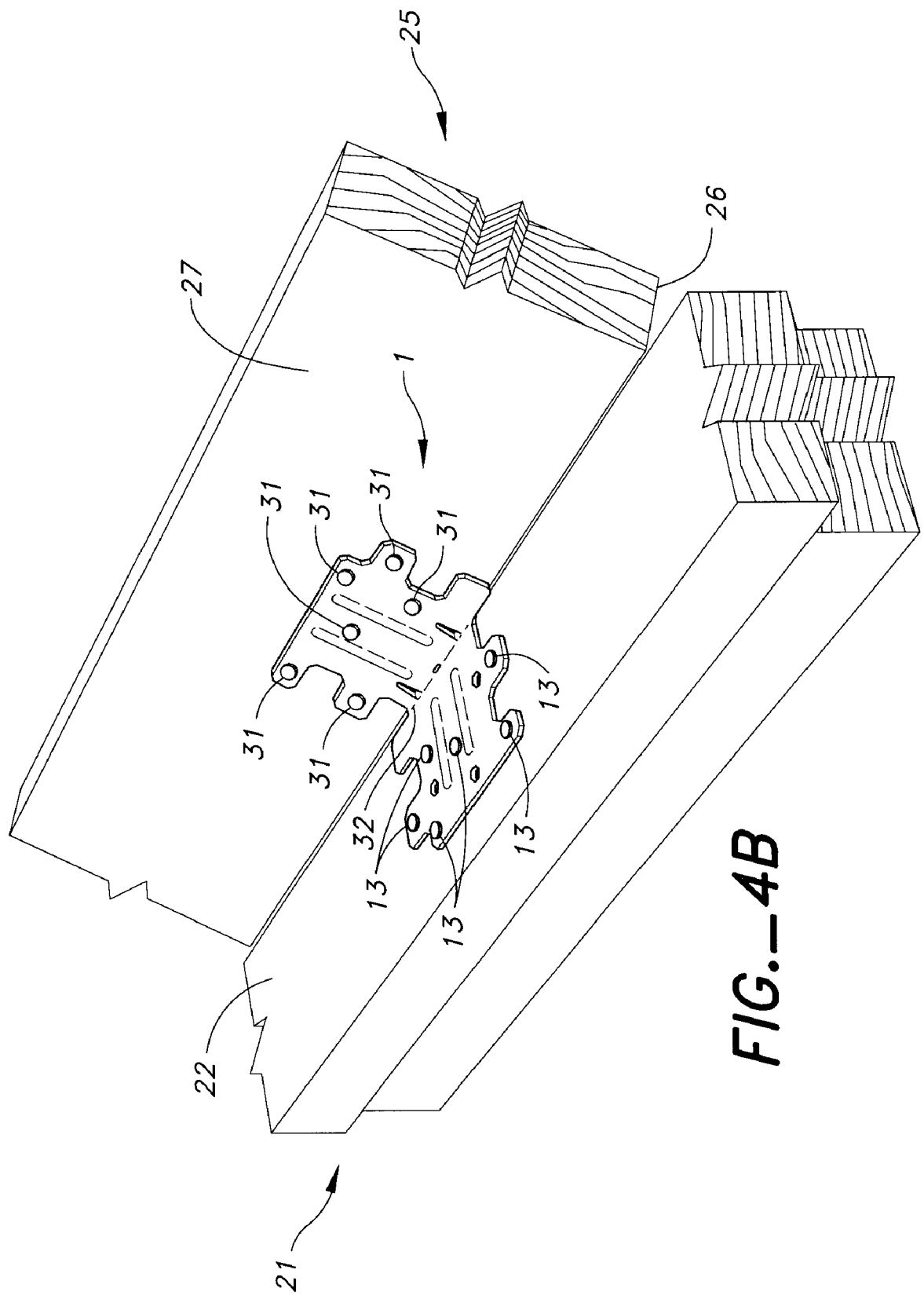
FIG._4B

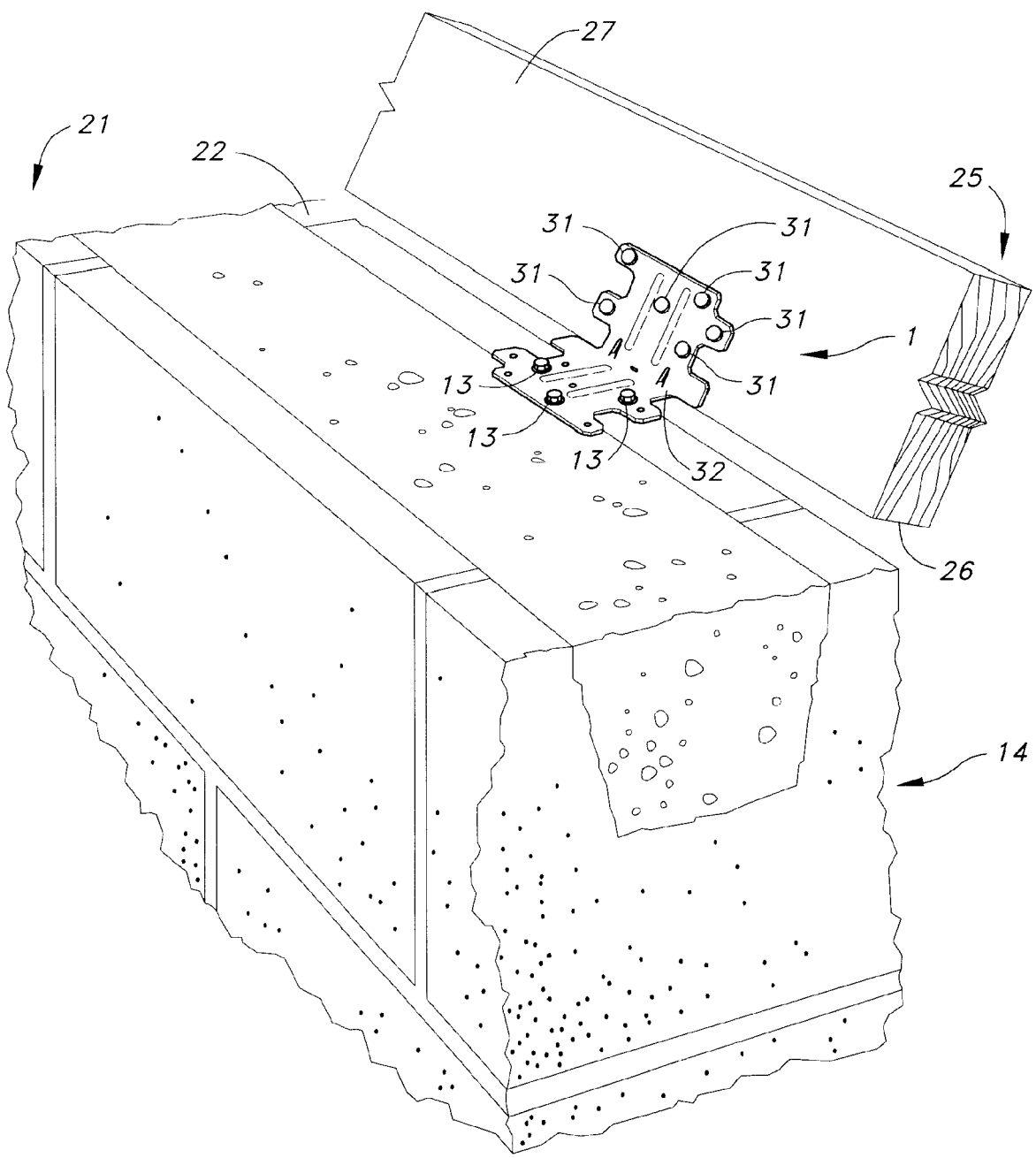
FIG._5A

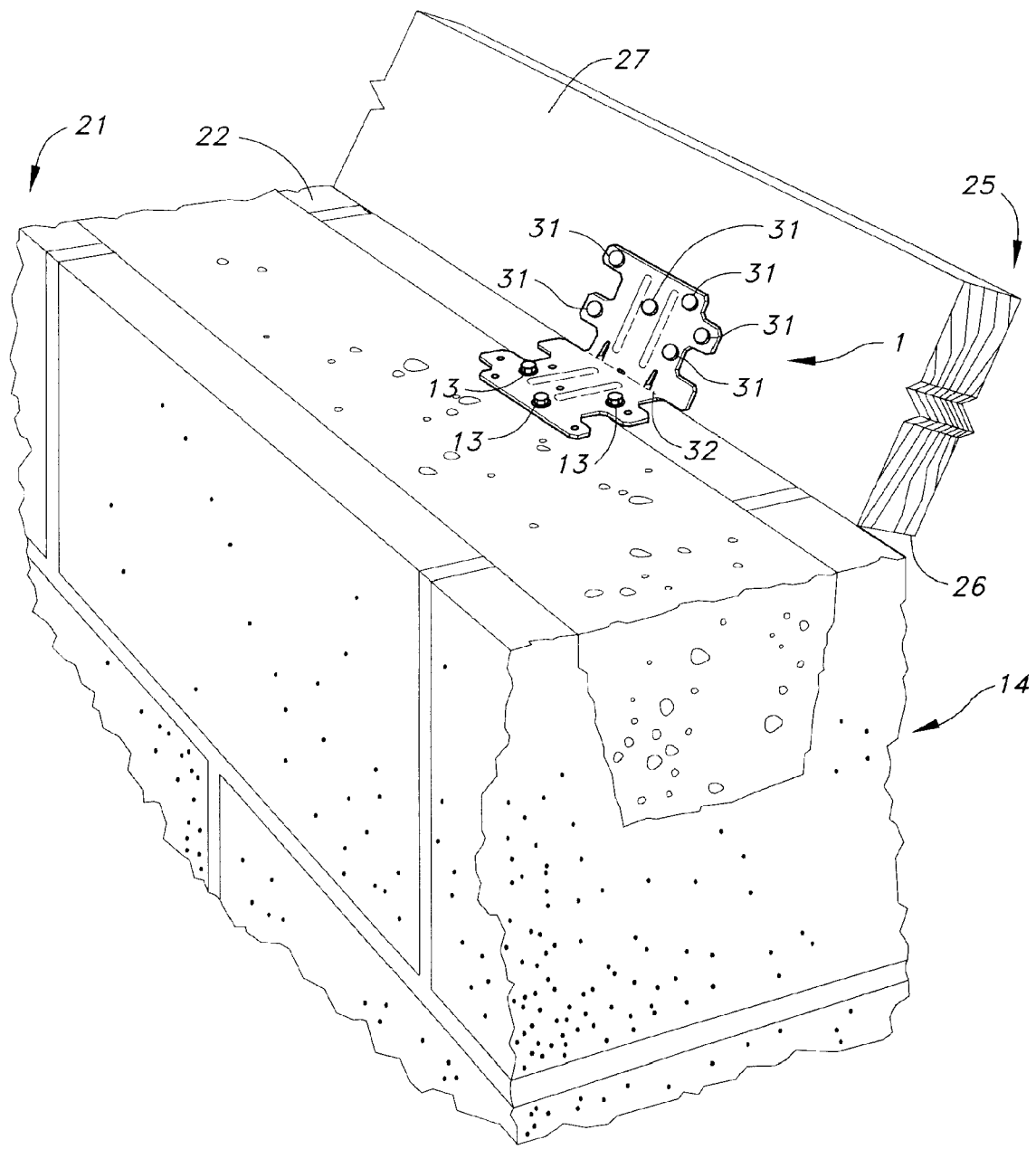
FIG._5B

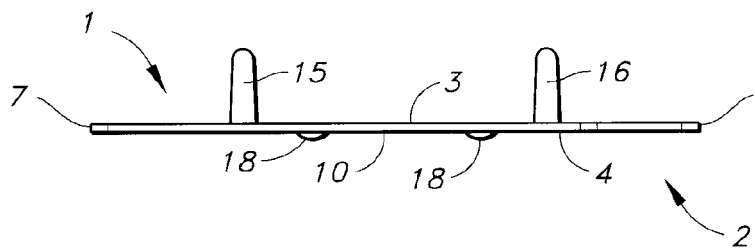
FIG._6
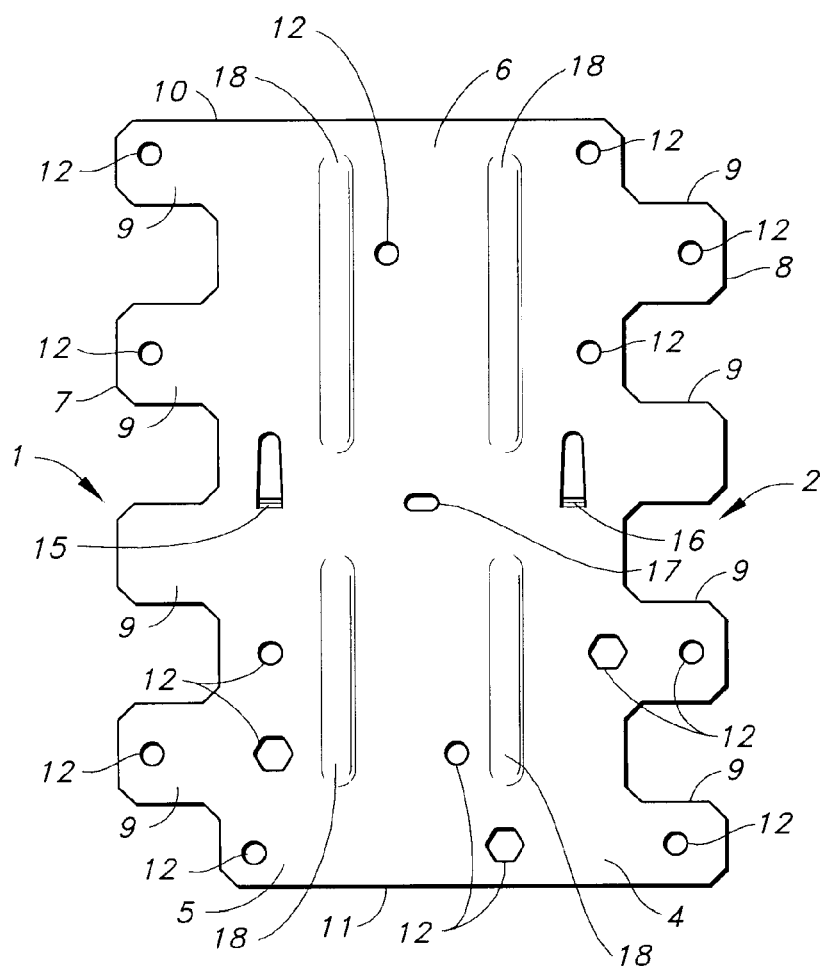
FIG._7
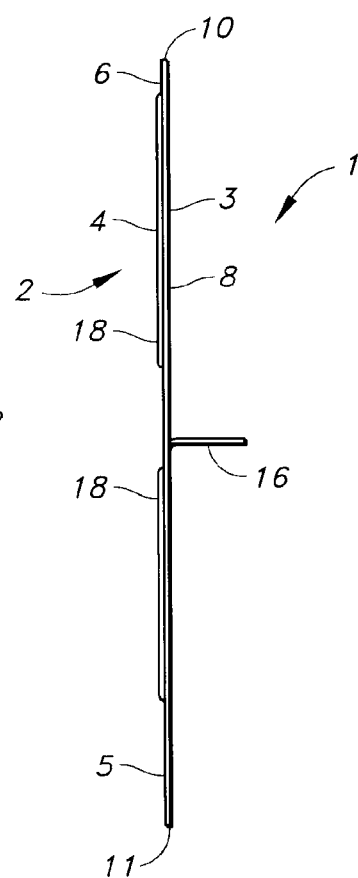
FIG._8

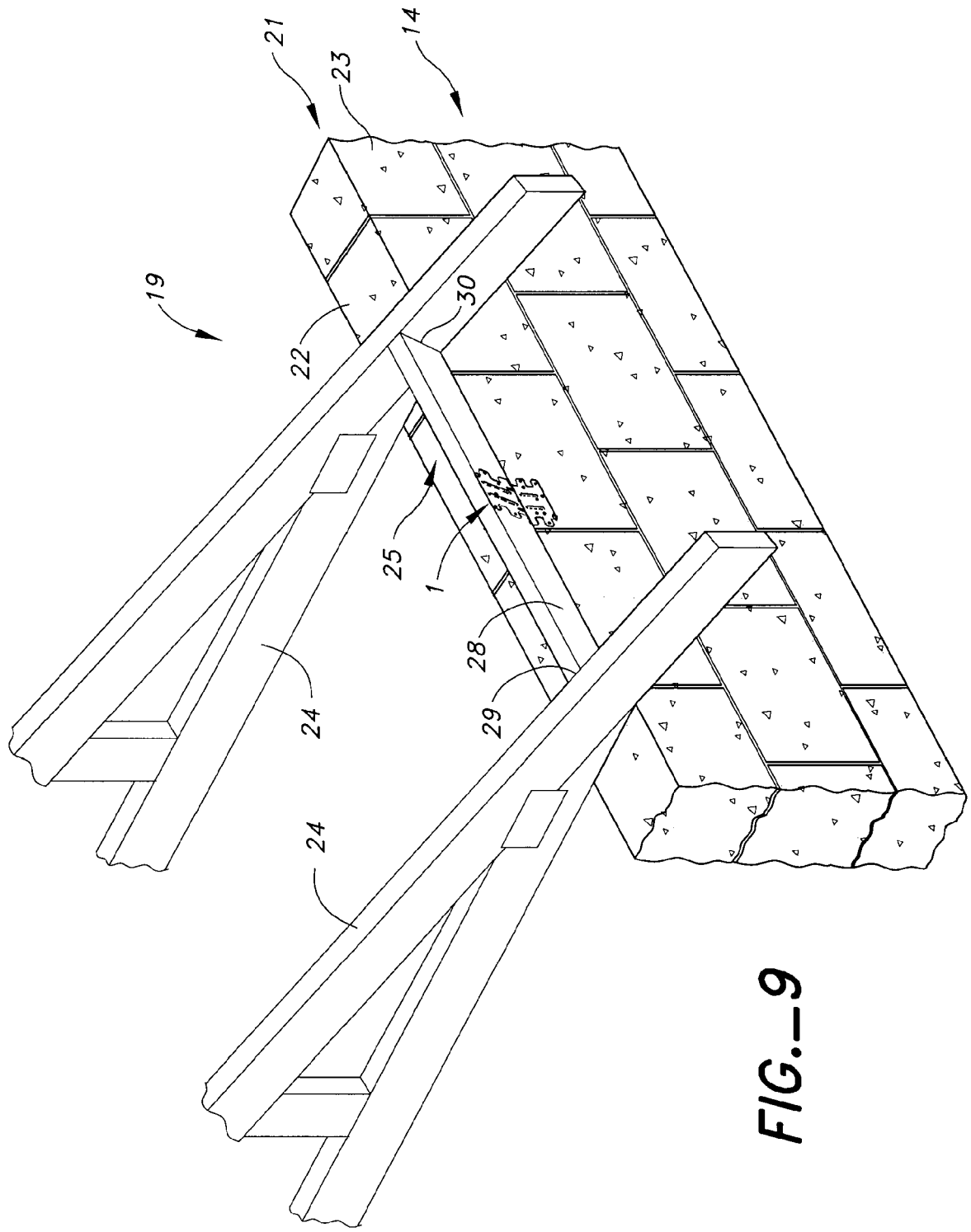
FIG._9

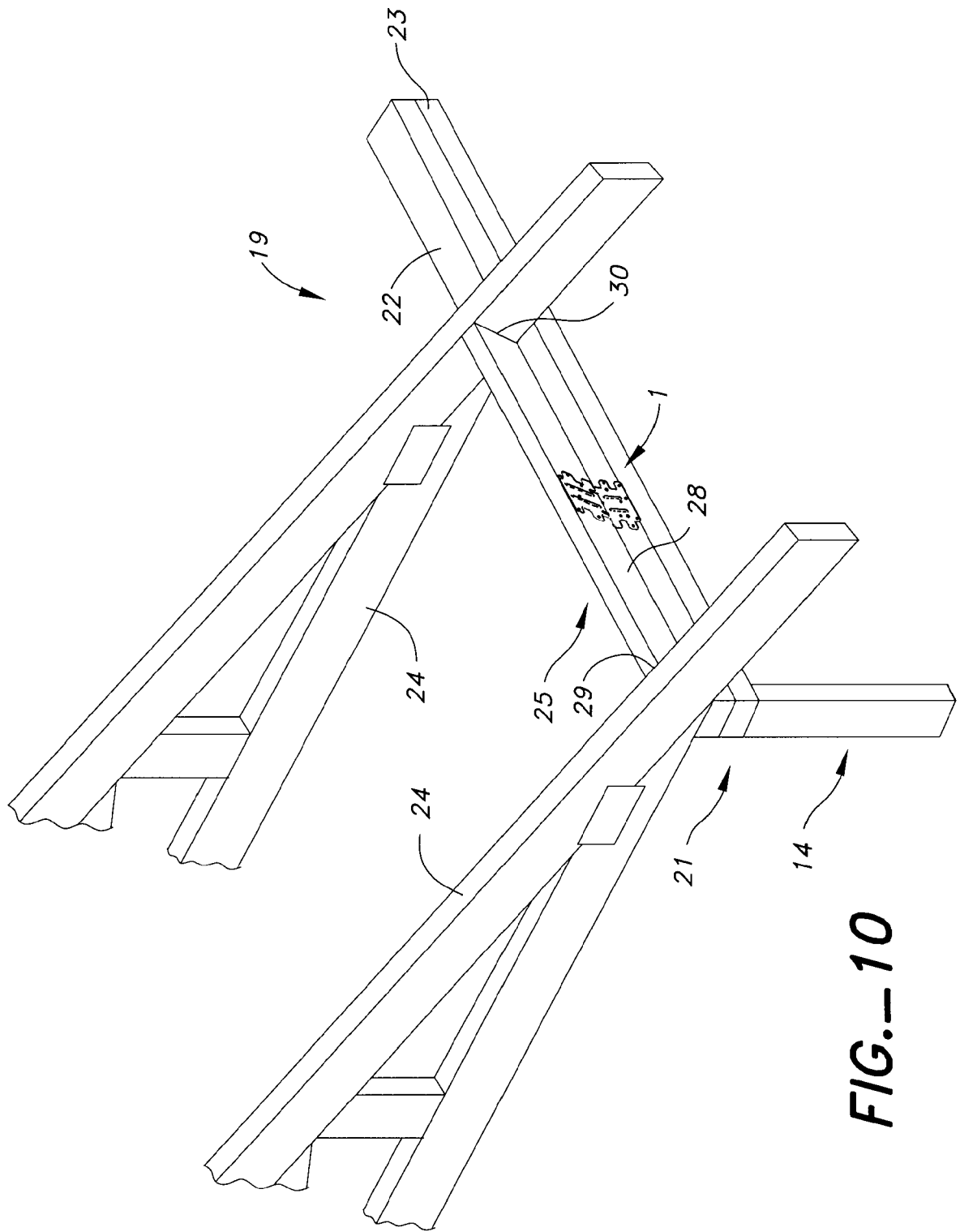
FIG._10

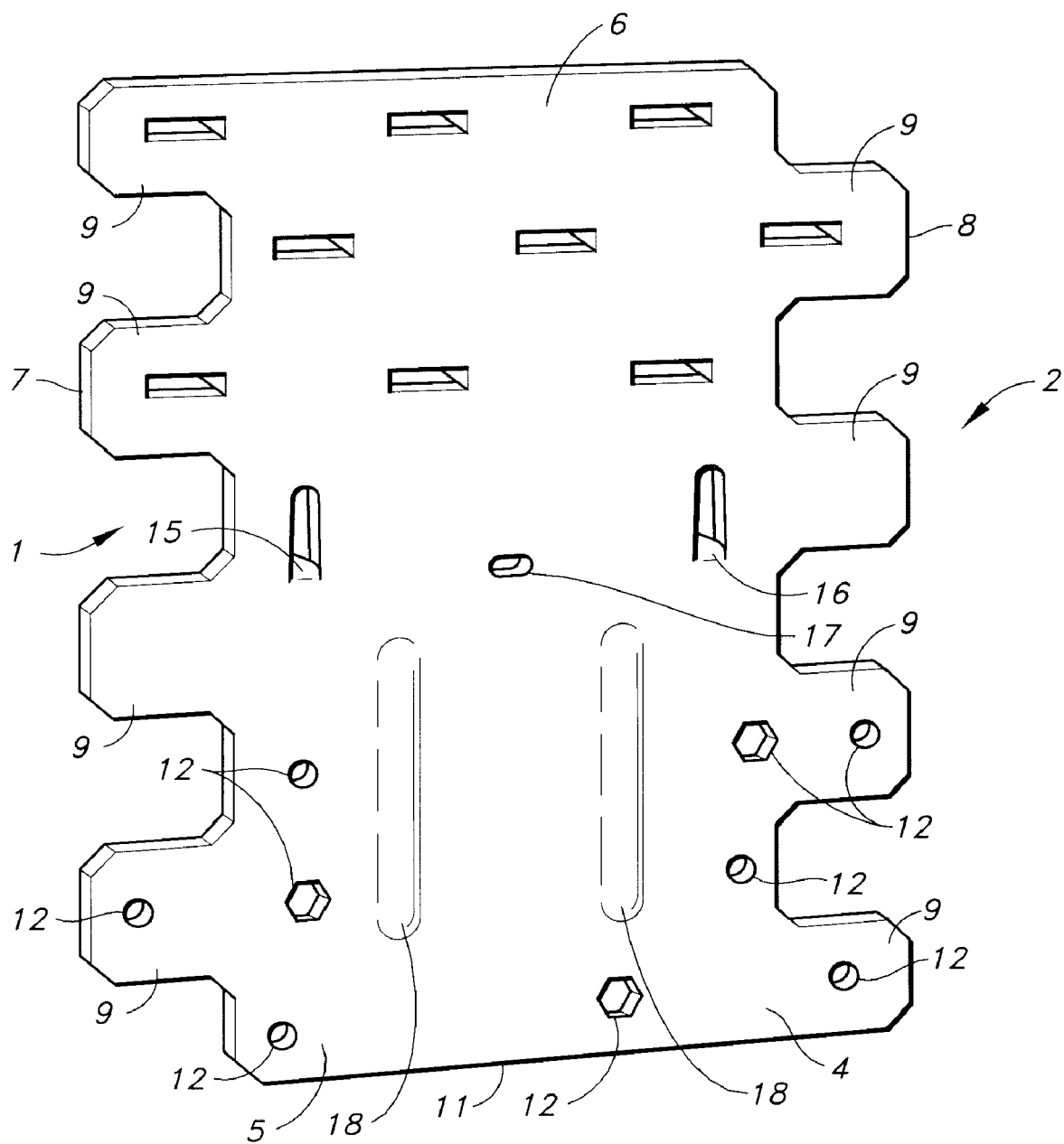
FIG._11

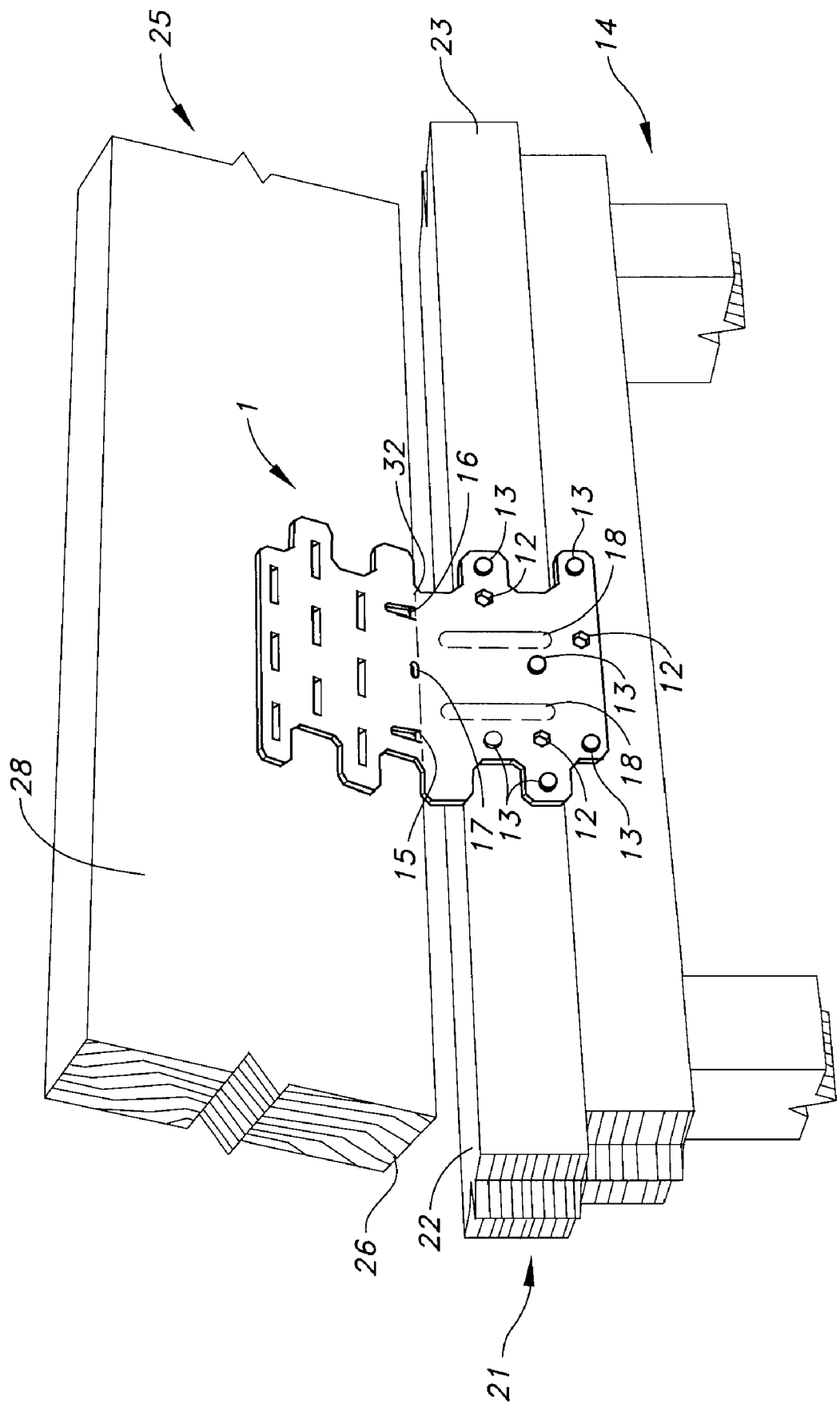
FIG._12A

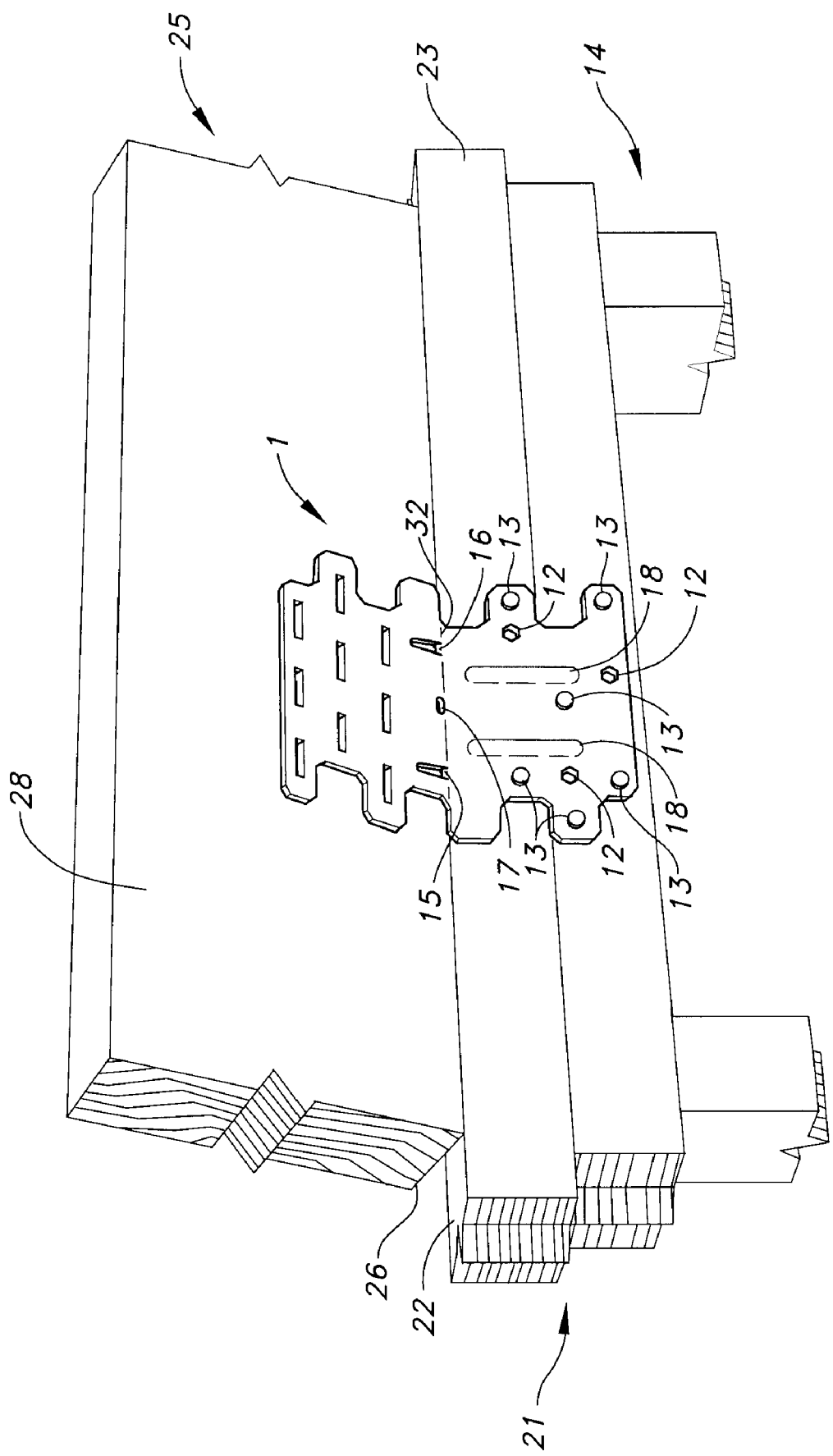
FIG._12B

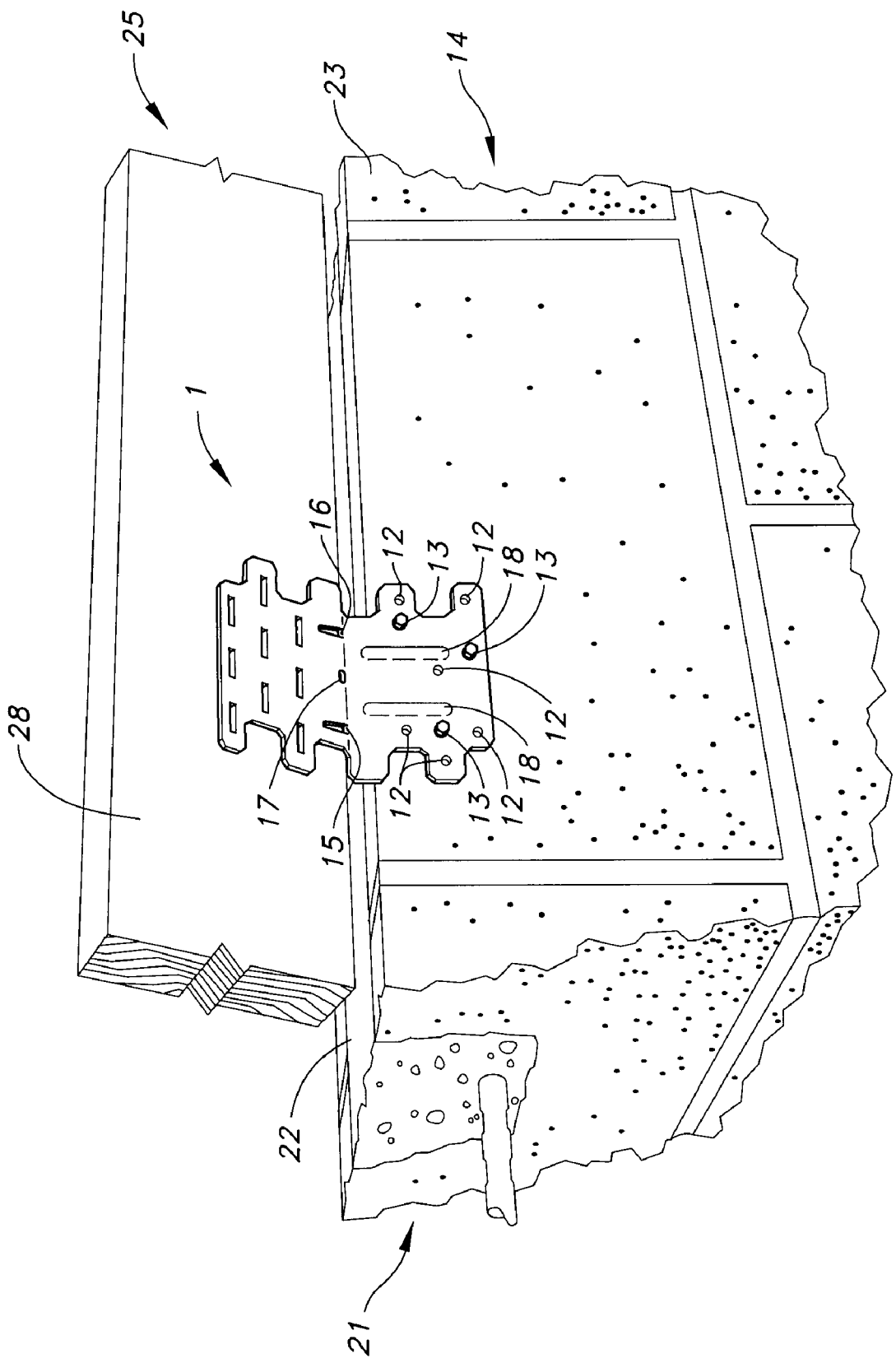
FIG._13A

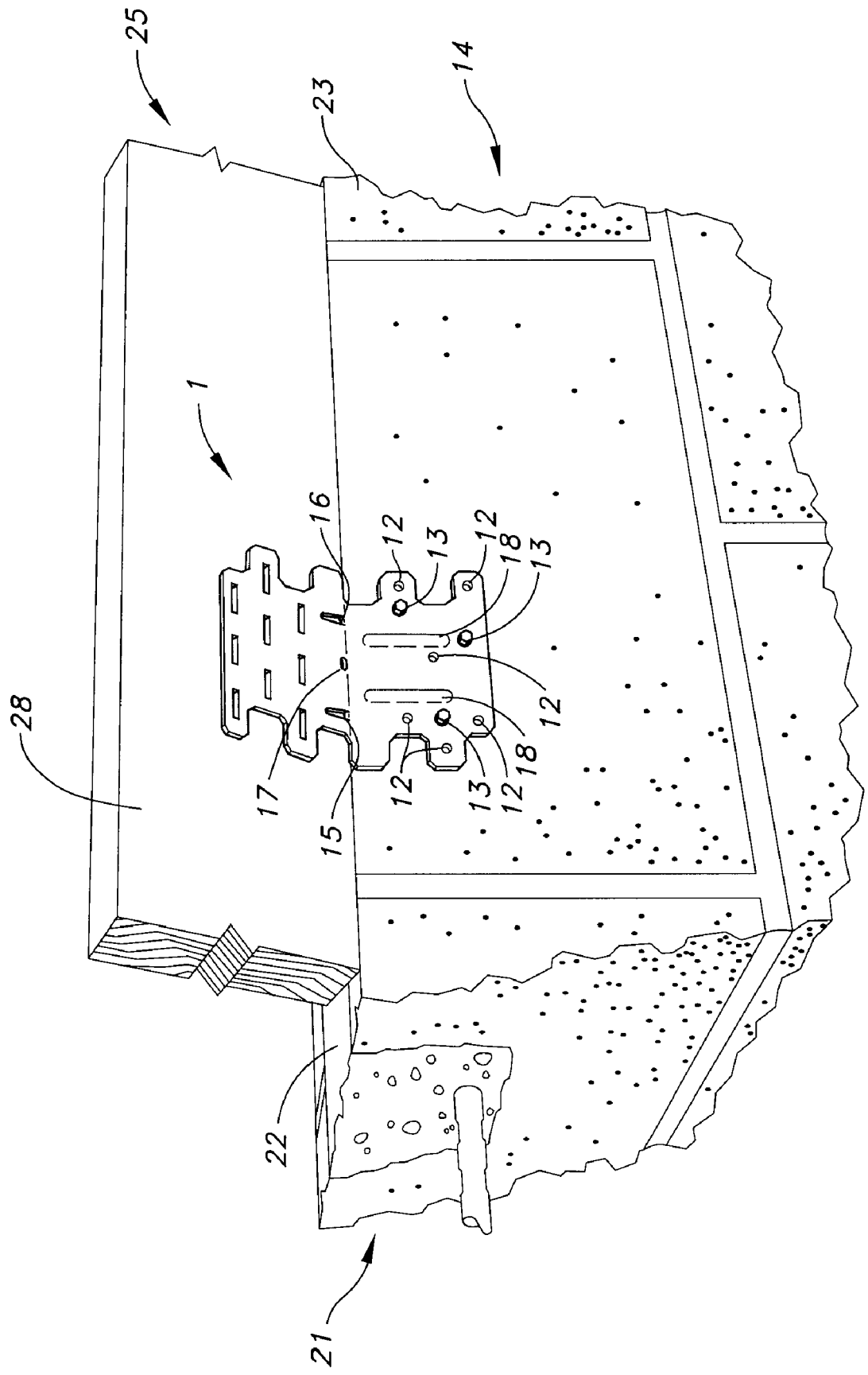

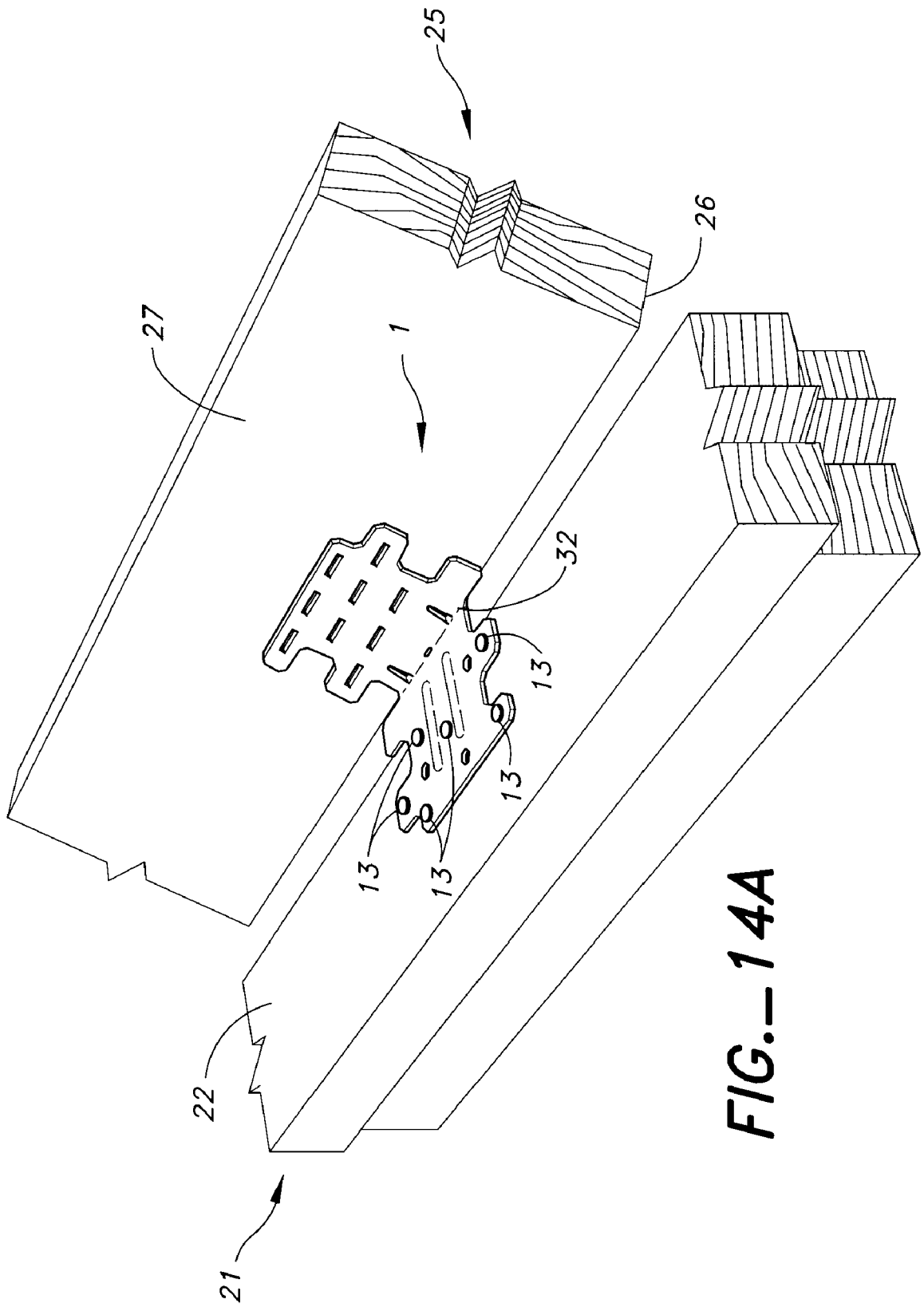
FIG._14A

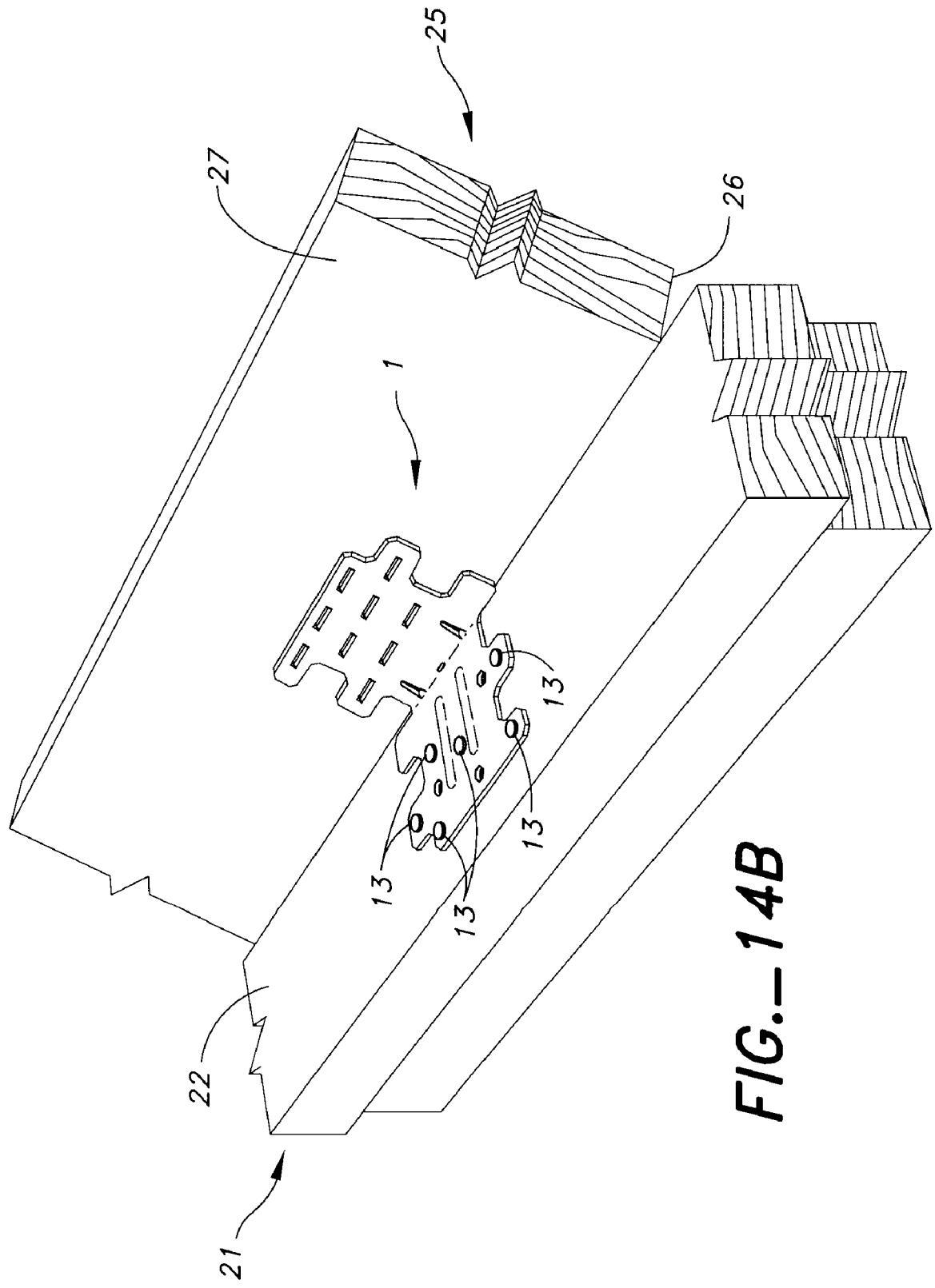
FIG._14B

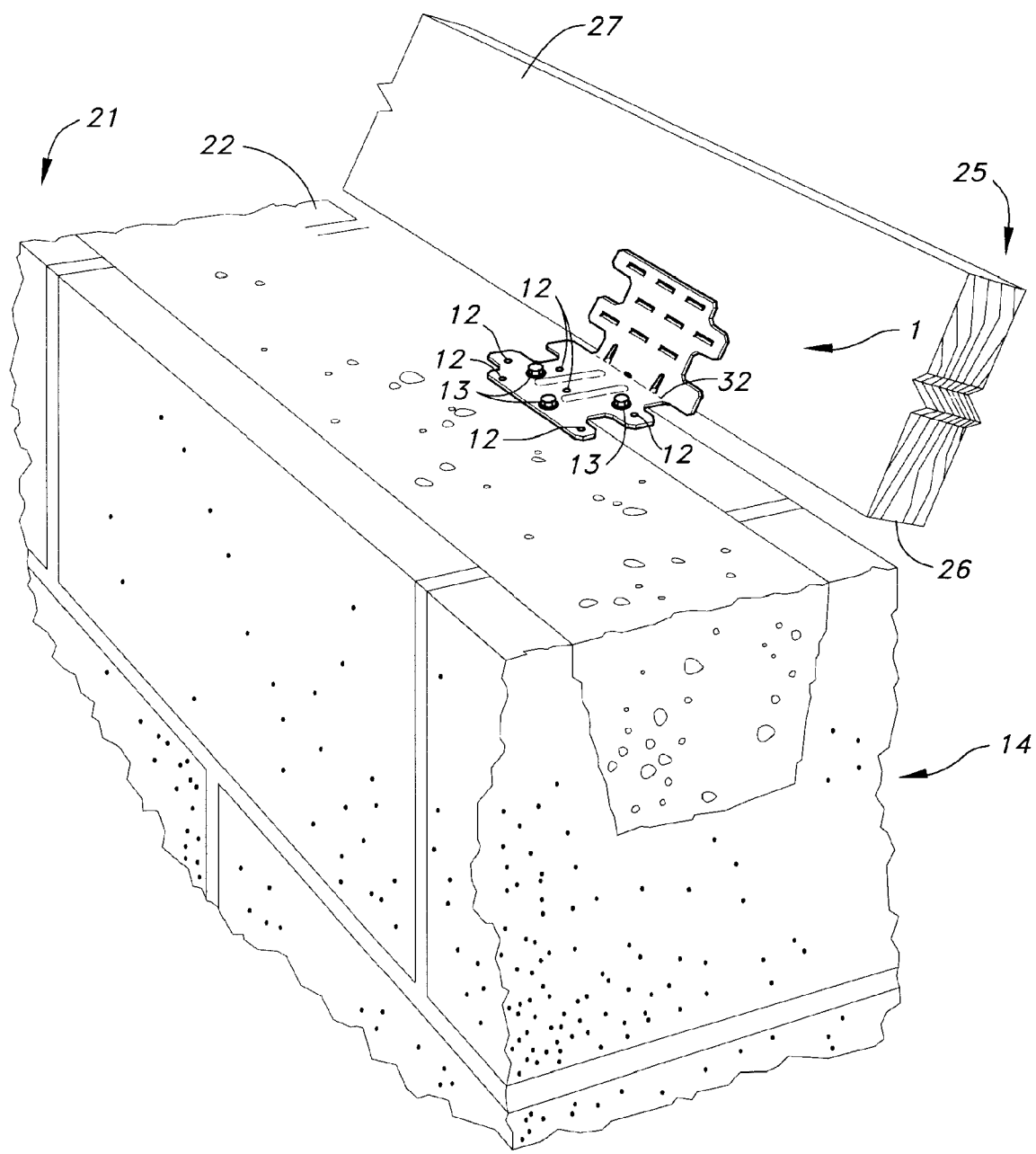
FIG._15A

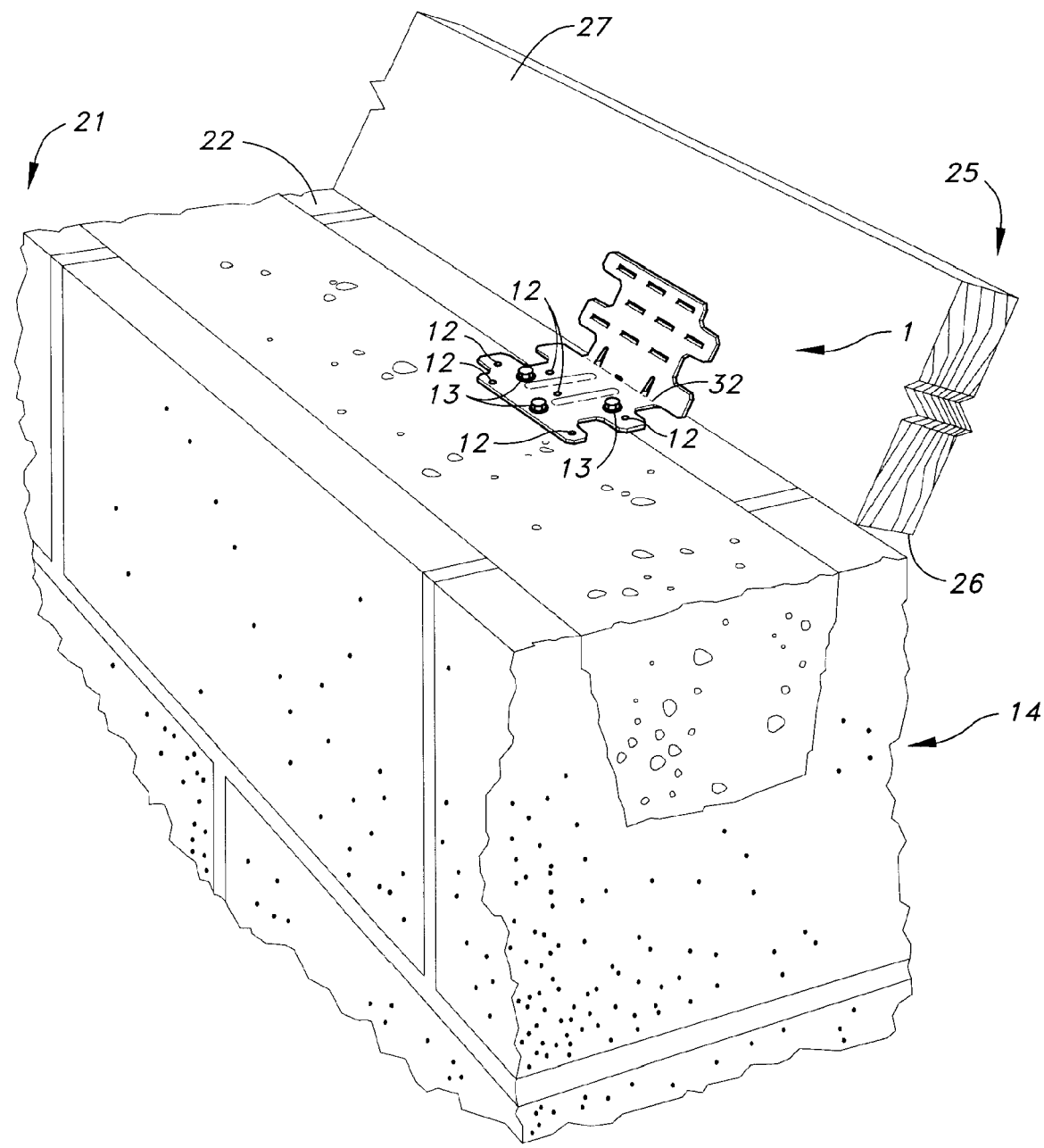
FIG._15B

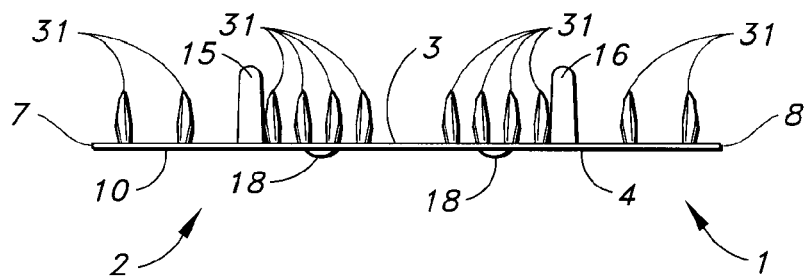
FIG._16
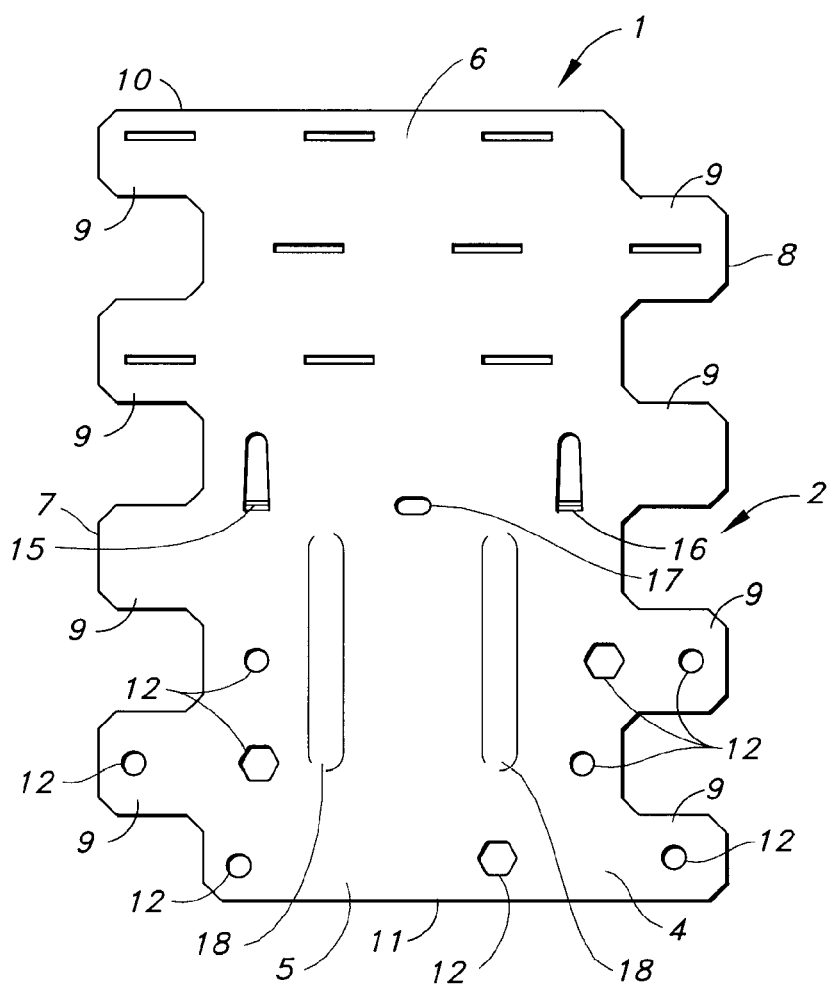
FIG._17
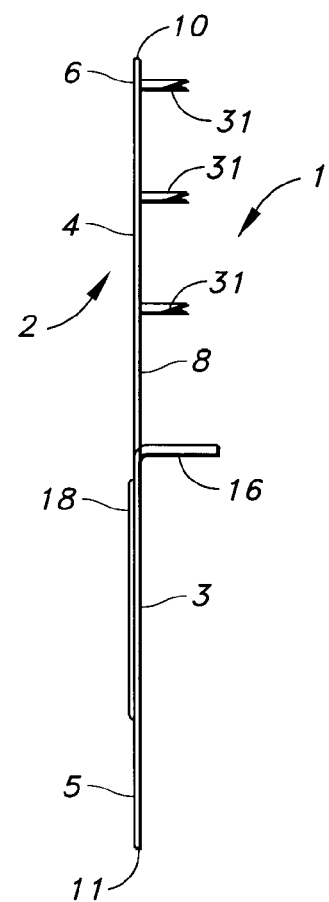
FIG._18

ROOF BOUNDARY CLIP

The present application is a division of Ser. No. 10/693,595, filed Oct. 23, 2003 now U.S. Pat. No. 7,293,390.

BACKGROUND OF THE INVENTION

The present invention relates to the connection of roof diaphragms to the vertical walls of a structure. The roof diaphragm must remain connected to the walls in order to maintain the integrity of the entire structure. The connections between the roof diaphragm and the walls must principally resist two forces: uplift, particularly in high wind areas, where hurricanes or tornadoes can lift the roof off a structure; and sheer, particularly in earthquake-prone areas. The connection of the present invention is designed to resist shear forces. Roof trusses or rafters that support and form part of the roof diaphragm, rest on the tops of the walls of a structure. The ends of the trusses or rafters are typically tied down with hurricane ties or the like in order to resist uplift. To resist shear forces, blocking members are placed between the ends of the trusses or rafters, parallel to and on top of the walls, strengthening and forming part of the roof diaphragm. The ends of the trusses or rafters are toenailed—the driving of elongated fasteners such as nails at an angle through one member and into the other—into the blocking members. The sheathing—typically plywood or oriented strand board—can also be nailed to the blocking creating an even stronger roof diaphragm. The clip of the present invention is a new and superior means of attaching the blocking members to the walls in order to resist shear forces that would otherwise tend to push the roof off the tops of the walls.

Clips are presently used to attach the blocking of roof diaphragms to the top portions of walls to provide shear anchorage for roof diaphragms; however, there exists a need in the industry for making a more reliable connection between the roof diaphragm and the top of the wall that is easily accomplished and amenable to current building practices.

BRIEF SUMMARY OF THE INVENTION

The gist of the present invention is to provide a clip that eases installation of the clip to blocking members both in the field and at the factory by the truss manufacturer.

It is an object of the present invention to provide a roof boundary connection having a a wall having a top portion, the top portion having a top surface and an outer surface, a plurality of generally horizontal structural members surmounting and disposed generally perpendicular to the wall, a first blocking member having a bottom side, an inner side, outer side, a first end and a second end, each of said first and second ends in substantially abutting relationship with one of said plurality of generally horizontal members, a first clip connecting the first blocking member to the top portion of the wall, the clip having a body, having an attachment side and an opposing side, said body being divided into a base portion and a tab attachment portion joined to the base portion, and a first indexing tab projecting from the attachment side, wherein the first indexing tab interfaces with one of the top portion of the wall and the first blocking member, and a first plurality of fasteners attaches the clip to the top portion of the wall and a second plurality of fasteners attaches the clip to the first blocking member.

It is further object of the present invention to provide a method of making a roof boundary connection between the top portion of a wall and a blocking member disposed between and attached to a pair of generally horizontal structural members surmounting and disposed generally perpendicular to the wall, by means of a clip connecting the first blocking member to the top portion of the wall, the clip having a body, having an attachment side and an opposing side, said body being divided into a base portion and a tab attachment portion joined to the base portion, and a first indexing tab projecting from the attachment side, wherein the first indexing tab interfaces with one of the top portion of the wall and the first blocking member, and by means of a first plurality of fasteners that attaches the clip to the top portion of the wall, and by means of a second plurality of fasteners that attaches the clip to the first blocking member, wherein a portion of the clip is placed against the blocking member and the second plurality of fasteners is driven into the first blocking member, and a portion of the clip is placed against the top portion of the wall and the first plurality of fasteners is driven into the top portion of the wall, and the clip is bent along between the base portion and the tab attachment portion, and the blocking is attached to the pair of generally horizontal structural members at either end of the blocking.

It is an additional object of the present invention to employ nail prongs as integral connectors for attachment to blocking members, allowing truss manufacturers to pre-install connectors on blocking members at their factory with the same hydraulic presses that are used to assemble trusses with nail prong plates. The truss supplier will know the spacing needed for the trusses in the roof and can therefore cut the blocking members correctly in advance of installation, and then ship the trusses with blocking members having pre-attached clip members to the site where the trusses are raised on the roof, sheathing it applied to the trusses, and the blocking is attached to the trusses and the top portions of the wall creating a strong shear connection between the roof diaphragm and the top portions of the supporting walls.

The preferred embodiment of the clip of the present invention is formed with two indexing tabs that are set against the blocking. The clips are not pre-bent once attached to the blocking. Bending is easily done in the field. It is easier to stack and store the blocking with the pre-attached clips when the clips are straight and therefore flat. It is also easier to install the blocking with the clips unbent.

It is an additional object of the present invention to provide the clip of the present invention with pre-formed openings for receiving fasteners that are used to attach the clip to the other elements of the connection.

BRIEF DESCRIPTION OF THE DRAWINGS

FIG. 1 is a perspective view of a preferred embodiment of the clip of the present invention.

FIG. 2A is a perspective view of a preferred embodiment of the connection of the present invention, with a double wood top plate and a gap between the double wood top plate and the blocking member, and the clip attached to the outer surface of the wall.

FIG. 2B is a perspective view of a preferred embodiment of the connection of the present invention, with a double wood top plate and no gap between the double wood top plate and the blocking member, and the clip attached to the outer surface of the wall.

FIG. 3A is a perspective view of a preferred embodiment of the connection of the present invention, with a masonry wall and a gap between the top portion of the masonry wall and the blocking member, and the clip attached to the outer surface of the wall.

FIG. 3B is a perspective view of a preferred embodiment of the connection of the present invention, with a masonry wall and no gap between the top portion of the masonry wall and the blocking member, and the clip attached to the outer surface of the wall.

FIG. 4A is a perspective view of a preferred embodiment of the connection of the present invention, with a double wood top plate and a gap between the double wood top plate and the blocking member, and the clip attached to the top surface of the wall.

FIG. 4B is a perspective view of a preferred embodiment of the connection of the present invention, with a double wood top plate and no gap between the double wood top plate and the blocking member, and the clip attached to the top surface of the wall.

FIG. 5A is a perspective view of a preferred embodiment of the connection of the present invention, with a masonry wall and a gap between the top portion of the masonry wall and the blocking member, and the clip attached to the top surface of the wall.

FIG. 5B is a perspective view of a preferred embodiment of the connection of the present invention, with a masonry wall and no gap between the top portion of the masonry wall and the blocking member, and the clip attached to the top surface of the wall.

FIG. 6 is a top down view of a preferred embodiment of the clip of the present invention.

FIG. 7 is a front elevation view of a preferred embodiment of the clip of the present invention.

FIG. 8 is a side elevation view of a preferred embodiment of the clip of the present invention.

FIG. 9 is a perspective view of a preferred embodiment of the connection of the present invention with a masonry wall.

FIG. 10 is a perspective view of a preferred embodiment of the connection of the present invention with a wood frame wall.

FIG. 11 is a perspective view of a preferred embodiment of the clip of the present invention having nail prongs.

FIG. 12A is a perspective view of a preferred embodiment of the connection of the present invention, with a double wood top plate and a gap between the double wood top plate and the blocking member, and the clip attached to the outer surface of the wall.

FIG. 12B is a perspective view of a preferred embodiment of the connection of the present invention, with a double wood top plate and no gap between the double wood top plate and the blocking member, and the clip attached to the outer surface of the wall.

FIG. 13A is a perspective view of a preferred embodiment of the connection of the present invention, with a masonry wall and a gap between the top portion of the masonry wall and the blocking member, and the clip attached to the outer surface of the wall.

FIG. 13B is a perspective view of a preferred embodiment of the connection of the present invention, with a masonry wall and no gap between the top portion of the masonry wall and the blocking member, and the clip attached to the outer surface of the wall.

FIG. 14A is a perspective view of a preferred embodiment of the connection of the present invention, with a double wood top plate and a gap between the double wood top plate and the blocking member, and the clip attached to the top surface of the wall.

FIG. 14B is a perspective view of a preferred embodiment of the connection of the present invention, with a double wood top plate and no gap between the double wood top plate and the blocking member, and the clip attached to the top surface of the wall.

FIG. 15A is a perspective view of a preferred embodiment of the connection of the present invention, with a masonry wall and a gap between the top portion of the masonry wall and the blocking member, and the clip attached to the top surface of the wall.

FIG. 15B is a perspective view of a preferred embodiment of the connection of the present invention, with a masonry wall and no gap between the top portion of the masonry wall and the blocking member, and the clip attached to the top surface of the wall.

FIG. 16 is a top down view of a preferred embodiment of the clip of the present invention having nail prongs.

FIG. 17 is a front elevation view of a preferred embodiment of the clip of the present invention having nail prongs.

FIG. 18 is a side elevation view of a preferred embodiment of the clip of the present invention having nail prongs.

DETAILED DESCRIPTION OF THE INVENTION

As best seen in FIGS. 1, 6, 7 and 8, in its most preferred form, the clip 1 of the present invention is cut from 20-gauge galvanized sheet steel. Preferably, the clip 1 comprises a body 2 having an attachment side 3 and an opposing side 4, the body 2 being divided into a base portion 5 and a tab attachment portion 6 joined to the base portion 5. Preferably, the body 2 has first side edge 7 and a second side edge 8. Preferably, the first side edge 7 and the second side edge 8 each have a plurality of projections 9 that extend in the plane of the body 2. Most preferably, the first side edge 7 has four projections 9 and the second side edge also has four projections 9. Preferably, the body 2 is substantially rectangular, with a first end edge 10 in the tab attachment portion 6 and a second end edge 11 in the base portion 5. Preferably, the clip 1 has a plurality of fastener openings 12. Most preferably, there are six fastener openings 12 in the tab attachment portion 6 and nine fastener openings 12 in the base portion 5. Of the six fastener openings 12 in the tab attachment portion, three are in the three projections 9 nearest the first end edge 10. Of the nine fastener openings 12 in the base portion 5, three are in the three projections 9 nearest the second end edge 11. Of the six fastener openings 1 2 in the base portion 5, but not in the projections 9, three are a different shape from the rest of the fastener openings 12 in the clip 1. Preferably, these three fastener openings 12 are hexagonal, whereas all the other fastener openings 12 are round. The three hexagonal fastener openings 12 indicate where to use, as a first plurality of fasteners 13 attaching the clip 1 to a wall 14 that is a masonry wall 14, masonry screws 13.

Preferably, the clip 1 has first indexing tab 15 projecting from the attachment side 3. Most preferably, the clip 1 has a second indexing tab 16 projecting from the attachment side 3. Most preferably, the first indexing tab 15 and the second indexing tab 16 are bent out of the tab attachment portion 6. This first indexing tab 15 and the second indexing tab 16 allow the clip 1 to be rapidly attached with the correct alignment and spacing to allow all of the necessary fasteners to be quickly and correctly installed.

Preferably, there is a score opening 17 generally in the middle of the body 2 between the first indexing tab 15 and the second indexing tab 16, and all three lie on a line that traverses the body 2 of the clip 1, dividing the body 2 into the base portion 5 and the tab attachment portion 6. Most preferably, a side of one of the projections 9 on the first side edge 7, a side of one of the projections 9 on the second side edge 8, the first indexing tab 15, the second indexing tab 16 and the score opening 17 all line up to aid in bending the clip 1 when it is installed. Preferably, the clip 1 is bent to an angle that preferably allows the first blocking member 25 to match the slope of the adjacent roof trusses or rafters after the clip 1 is attached to both the blocking member 25 and the top portion 21 of the wall 14.

Preferably, the clip 1 additionally comprises reinforcing embossments 18 in the base portion 5 and the tab attachment portion 6. Most preferably, the reinforcing embossments 18 are linear and perpendicular to the first end edge 10 and the second end edge 11, with two in the base portion 5 and two in the attachment portion 6. Most preferably, the reinforcing embossments 18 in the base portion 5 are slightly shorter than the reinforcing embossments 18 in the attachment portion 6. The reinforcing embossments 18 reinforce the clip 1 against deformation when it is under load and confine installation bending to the middle of the clip 1.

As best seen in FIGS. 2A and 2B, in a preferred embodiment, the roof boundary connection 19 comprises a wall 14 having a top portion 21, the top portion 21 having a top surface 22 and an outer surface 23. In a preferred embodiment, the wall 14 is a light wood frame wall, typically framed with nominal 2×4 lumber. Preferably, the top portion 21 is a wood top plate, most preferably a double top plate. As best seen in FIGS. 3A and 3B, the wall 14 is a masonry wall, typically poured concrete or block. In this case, the top portion 21 is simply the top of the masonry wall. As best seen in FIGS. 9 and 10, a plurality of generally horizontal structural members 24 surmount the wall 14 and are disposed generally perpendicular to the wall 14. The generally horizontal structural members 24 are preferably roof framing members, either roof trusses or rafters. These are typically made from lumber lighter than the nominal 2×4 framing used to construct the light wood frame wall 14. The roof trusses or rafters span from one wall to another and support a roof diaphragm. The roof boundary connection 19 further comprises a first blocking member 25 having a bottom side 26, an inner side 27, an outer side 28, a first end 29 and a second end 30. The first end 29 and the second end 30 are each in substantially abutting relationship with one of the plurality of generally horizontal members 24. The first blocking member 25 is preferably made of wood. The first and second ends 29 and 30 of the first blocking member 25 are typically attached to the roof trusses or rafter by toe-nailing though the truss or rafter into the blocking member 25. A first clip 1 connects the first blocking member 25 to the top portion 21 of the wall 14. The clip 1 comprises a body 2 having an attachment side 3 and an opposing side 4, the body 2 being divided into a base portion 5 and a tab attachment portion 6 joined to the base portion 5. A first indexing tab 15 projects from the attachment side 3. The first indexing tab 15 interfaces with one of the top portion 21 of the wall 14 and the first blocking member 25. A first plurality of fasteners 13 attaches the clip 1 to the top portion 21 of the wall 14 and a second plurality of fasteners 31 attaches the clip 1 to the first blocking member 25. When the top portion 21 of the wall 14 is wood, the first plurality of fasteners 13 is preferably nails. When the blocking member 25 is wood, and the clip will be installed in the field, the second plurality of fasteners 31 is preferably nails.

Preferably, the clip 1 has a first indexing tab 15 and a second indexing tab 16 and both are placed so that they interface with the bottom side 26 of the first blocking member 25, thereby ensuring proper alignment of the clip 1 in relation to the first blocking member 25 and ensuring that enough of the tab attachment portion 6 interfaces with the first blocking member 25 and that all of the second plurality of fasteners 31 attach the clip 1 to the first blocking member 25. However, the first indexing tab 15, and the second indexing tab 16 if it is present, can interface with the top portion 21 of the wall 14 to perform the same function with respect to the wall 14.

As shown in FIGS. 2A, 2B, 3A and 3B, the clip 1 can be installed so that there is little or no space between the first blocking member 25 and the top portion 21 of the wall 14. Or the clip 1 can be installed so that there is a gap between the first blocking member 25 and the top portion 21 of the wall 14. The amount of space between the first blocking member 25 and the top portion 21 of the wall 14 is preferably no more than ¾ inches. The space allows the first blocking member 25 to be angled to match the pitch of the roof trusses or rafters, so that the first blocking member 25 will not interfere with the roof sheathing when it is applied, and to leave a gap for wall sheathing or even ventilation.

As best seen in FIGS. 11, 16, 17 and 18, in an alternate preferred embodiment, the second plurality of fasteners 31 is a plurality of nail prongs 31 extending from the attachment side 3 of the tab attachment portion 6 of the first clip 1, and the first and second indexing tabs 15 and 16 extend further from the attachment side 3 than the plurality of nail prongs 31. The nail prongs 31 differ from the first and second indexing tabs 15 and 16 in that they are sharper and are crimped for greater rigidity. The nail prongs 31 are primarily intended for pre-attachment of the clip 1 to blocking member 25 by truss manufacturers. The nail prongs 31 are driven by clamping the clip 1 between the first blocking member and a block or by using a hydraulic press. Nail prongs 31 allow truss manufacturers to install clips 1 on blocking members 25 with the same hydraulic presses that are used to assemble trusses with nail prong plates. The preferred embodiment of the clip 1 of the present invention is formed with first and second indexing tabs 15 and 16 that are set against the blocking member 25 so that the clip 1 can be installed rapidly in the correct manner, which is particularly important in a factory setting. The clips 1 attached to the precut blocking members 25 are preferably shipped unbent with the trusses 24. At the job site, the trusses 24 are set on the roof and spaced accordingly, and then the blocking 25 is attached to the trusses 24 and the tops of the walls 14 on which the trusses 24 are set. The blocking 25 is attached to the top portion 21 of the walls 14 by means of the clips 1. The portion of the clip 1 jutting out from the blocking 25—the base portion 5—is aligned with the top portion 21 of the wall 14, be it the side face or top surface 22 of the wall 14, so that the appropriate number of fasteners 13 for the wall 14 can be installed. This should result in, at the most, a gap of approximately ¾ of inch between the top portion 21 of the wall 14 and the blocking 25. The first plurality of fasteners 13, appropriate for the wall 14 are driven through the proper openings 12 in the clip 1 and into the wall 14. The blocking 25 is then set at the proper angle for attachment to the trusses 24, which likely means that the clip 1 is bent at the interface between the base portion 5 and the tab attachment portion 6, and then fasteners, preferably nails, are driven through the blocking 25 at an angle and into the trusses 24.

The blocking 25 can be attached to the trusses 24 after the top sheathing has been applied to the trusses 24 or before. Because the clip 1 can be bent in the field and attached to the top surface 22 of the top portion 21 of the wall 14 or the side face of the top portion 21 of the wall 14, the installer has a choice as to where he can install the clip 1. Sometimes it will be difficult to attach the clip to the top surface 21 of the wall 14. Sometimes, the installer will prefer to attach the clip 1 to the top surface 21 of the wall 14, so the clip 1 is less likely to interfere with the sheathing of the outer surface 23 of the wall 14.

As best seen in FIGS. 2A through 5B and 12A through 15B, preferably the attachment side 3 of the base portion 5 interfaces with the top portion 21 of the wall 14. Preferably, the clip 1 is attached to either the top surface 22 of the wall 14 or the outer surface 23 of the wall 14, according to which is more easily accessible during installation. The attachment side 3 of the tab attachment portion 6 preferably interfaces with the inner side 27 of the first blocking member 25, but it can also interface with the outer side 28 of the blocking member. Typically, the attachment side 3 of the tab attachment portion 6 interfaces with the inner side 27 of the blocking member 25 when the attachment side 3 of the base portion 5 interfaces with the top surface 22 of the wall 14; the attachment side 3 of the tab attachment portion 6 interfaces with the outer side 28 of the blocking member 25 when the attachment side 3 of the base portion 5 interfaces with the outer surface 23 of the wall 14.

The tab attachment portion 6 of the first clip 1 is preferably placed against the inner side 27 of the first blocking member 25 such that the first indexing tab 15 interfaces with the bottom side 26 of the first blocking member 25. The second plurality of fasteners 31 is driven into the inner side 27 of the first blocking member 25. The second plurality of fasteners 31 is preferably either nails or nail prongs. The base portion 5 of the first clip 1 is placed against the top portion 21 of the wall 14. The first plurality of fasteners 13 is driven into the top portion 21 of the wall 14, and the first clip 1 is bent along a line of juncture 32 between the base portion 5 and the tab attachment portion 6.

Alternatively, the tab attachment portion 6 of the first clip 1 is placed against the top portion 21 of the wall 14 such that the first indexing tab 15 interfaces with the top surface 22 of the wall 14. The first plurality of fasteners 13 is driven into the top portion 21 of the wall 14. The base portion 5 of the first clip 1 is placed against the outer side 28 of the first blocking member 25. The second plurality of fasteners 31 is driven into the outer side 28 of the first blocking member 25, and the first clip 1 is bent along a line of juncture 32 between the base portion 5 and the tab attachment portion 6.

We claim:

1. A method of making a roof boundary connection comprising the steps of:
   a. selecting a wall having a top portion, said top portion having a top surface and an outer surface;
   b. selecting and placing a plurality of generally horizontal structural members so that said plurality of generally horizontal structural members is surmounting and disposed generally perpendicular to said wall;
   c. selecting a first blocking member having a bottom side, an inner side, outer side, a first end and a second end, and placing said first blocking member so that each of said first and second ends in substantially abutting relationship with one of said plurality of generally horizontal members;
   d. selecting a first clip connecting said first blocking member to said top portion of said wall, said clip comprising:
      i. a body having an attachment side and an opposing side, said body being divided into a base portion and a tab attachment portion joined to said base portion; and
      ii. a first indexing tab projecting from said attachment side;
   wherein:
   e. placing said first clip so that said first indexing tab interfaces with one of said top portion of said wall and said first blocking member; and
   f. attaches said clip to said top portion of said wall with a first plurality of fasteners and attaches said clip to said first blocking member with a second plurality of fasteners.

2. The method of claim 1 further comprising the steps of:
   a. placing said attachment side of said base portion so that said attachment side interfaces with said top portion of said wall;
   b. placing said attachment side of said tab attachment portion so that said attachments side interfaces with said inner side of said first blocking member;
   c. placing said tab attachment portion of said first clip against said inner side of said first blocking member such that said first indexing tab interfaces with said bottom side of said first blocking member;
   d. driving said second plurality of fasteners into said inner side of said first blocking member;
   e. placing said wall attachment portion of said first clip against said top portion of said wall;
   f. driving said first plurality of fasteners into said top portion of said wall; and
   g. bending said first clip along a line of juncture between said base portion and said tab attachment portion.

3. The method of claim 1 further comprising the steps of:
   a. placing said tab attachment portion of said first clip against said top portion of said wall such that said first indexing tab interfaces with said top surface of said wall;
   b. driving said first plurality of fasteners into said top portion of said wall;
   c. placing said base portion of said first clip against said outer side of said first blocking member;
   d. driving said second plurality of fasteners into said outer side of said first blocking member; and
   e. bending said first clip along a line of juncture between said base portion and said tab attachment portion.

4. A method of pre-installing a first roof boundary clip to a first blocking member and making a roof boundary connection comprising the steps of:
   a. selecting said first blocking member having a bottom side, an inner side, outer side, a first end and a second end;
   b. selecting said first clip comprising:
      i. a body having an attachment side and an opposing side, said body being divided into a base portion and a tab attachment portion joined to said base portion; and
      ii. a plurality of fastener openings in said base portion of said body of said first clip;
   c. placing said attachment side of said attachment portion against one of said inner side and said outer side of said first blocking member;
   d. simultaneously driving substantially all of a second plurality of fasteners projecting from said attachment side of said attachment portion into said one of said inner side and said outer side of said first blocking member to attach said clip to said first blocking member;
   e. selecting a wall having a top portion, said top portion having a top surface and an outer surface;
   e. placing said attachment side of said base portion of said clip against one of said top surface and said outer surface of said top portion of said wall; and
   f. driving a first plurality of fasteners separate from said clip through two or more of said plurality of fastener openings in said base portion of said body of said first clip and into said top portion of said wall.

5. The method of claim 4 wherein:

a. said second plurality of fasteners is a plurality of nail prongs extending from said attachment side of said tab attachment portion;

b. said plurality of nail prongs is placed against one of said inner side and said outer side of said first blocking member; and c. substantially all of said plurality of nail prongs is simultaneously driven into said one of said inner side and said outer side of said first blocking member to attach said clip to said first blocking member.

6. The method of claim 5 wherein:

a. said wall is a masonry wall.

7. The method of claim 6 wherein:

a. said plurality of fasteners separate from said clip is masonry screws.

8. The method of claim 5 wherein:

a. said top portion of said wall is a wood top plate.

9. The method of claim 8 wherein:

a. said plurality of fasteners separate from said clip is nails.

10. The method of claim 5 wherein:

a. said first clip additionally comprises a score opening so that said score opening lies on a line that traverses said body, dividing said body into said base portion and said tab attachment portion.

11. The method of claim 5 wherein:

a. said first clip additionally comprises reinforcing embossments in said base portion and said tab attachment portion.

12. The method of claim 5 wherein:

a. said first clip additionally comprises first and second side edges that each have a plurality of projections that extend in the plane of said body.

13. The method of claim 12 wherein:

a. some of said plurality of fastener openings in said base portion of said body of said first clip are in said projections.

* * * * *